(12) United States Patent
Patella et al.

(10) Patent No.: US 7,826,466 B2
(45) Date of Patent: Nov. 2, 2010

(54) COMMUNICATION BUFFER SCHEME OPTIMIZED FOR VOIP, QOS AND DATA NETWORKING OVER A POWER LINE

(75) Inventors: James Philip Patella, Hernando, FL (US); William E. Earnshaw, Ocala, FL (US); Stanley J. Kostoff, II, Ocala, FL (US); William Winston Williams, Tarpon Springs, FL (US); Timothy Robert Gargrave, Ocala, FL (US)

(73) Assignee: Atheros Communications, Inc., San Jose, CA (US)

( * ) Notice: Subject to any disclaimer, the term of this patent is extended or adjusted under 35 U.S.C. 154(b) by 1304 days.

(21) Appl. No.: 10/180,175

(22) Filed: Jun. 26, 2002

(65) Prior Publication Data
US 2004/0001499 A1    Jan. 1, 2004

(51) Int. Cl.
H04L 12/28 (2006.01)
(52) U.S. Cl. ................................ 370/412; 370/444
(58) Field of Classification Search ............... 370/412, 370/444
See application file for complete search history.

(56) References Cited

U.S. PATENT DOCUMENTS

| | | | |
|---|---|---|---|
| 3,806,885 A | 4/1974 | Moore | |
| 4,569,044 A | 2/1986 | Tao et al. | |
| 4,581,734 A | 4/1986 | Olson et al. | |
| 4,630,261 A | 12/1986 | Irvin | |
| 4,677,612 A | 6/1987 | Olson et al. | |
| 4,682,324 A | 7/1987 | Ulug | |
| 4,720,850 A | 1/1988 | Oberlander et al. | |
| 4,726,018 A | 2/1988 | Bux et al. | |
| 4,792,947 A | 12/1988 | Takiyasu et al. | |
| 4,819,229 A | 4/1989 | Pritty et al. | |
| 4,881,241 A | 11/1989 | Pommier et al. | |
| 4,933,935 A * | 6/1990 | Adams | 370/406 |

(Continued)

FOREIGN PATENT DOCUMENTS

DE        3413144        10/1985

(Continued)

OTHER PUBLICATIONS

U.S. Appl. No. 09/632,303, filed Aug. 4, 2000, Yong, III.

(Continued)

*Primary Examiner*—Jayanti K Patel
*Assistant Examiner*—Bo Hui A Zhu
(74) *Attorney, Agent, or Firm*—Fish & Richardson P.C.

(57) ABSTRACT

Media Access Control (MAC) layer transmit and receive buffering with multi-level prioritization. The receive buffering allocates receive buffers for receiving frame data from a PHY interface in priority order using both a static and dynamic buffer allocation, and delivers completed buffers queued in a multi-level priority queue to a host interface highest priority first. The transmit buffering delivers completed buffers queued in a multi-level priority queue to the PHY interface in priority order. When the multi-level priority queue contains a buffer that is higher priority than one being prepared for transmit, a priority-based interruption causes the transmit processing of the buffer to be suspended at its current state with the higher priority buffer taking its place. Upon completion of the higher priority buffer, the suspended buffer is resumed at its current state.

17 Claims, 21 Drawing Sheets

U.S. PATENT DOCUMENTS

| | | | |
|---|---|---|---|
| 4,943,959 A | 7/1990 | Arnold | |
| 5,001,472 A | 3/1991 | Fischer et al. | |
| 5,003,539 A | 3/1991 | Takemoto et al. | |
| 5,046,069 A | 9/1991 | Calvignac et al. | |
| 5,081,678 A | 1/1992 | Kaufman et al. | |
| 5,105,423 A | 4/1992 | Tanaka et al. | |
| 5,121,396 A | 6/1992 | Irvin et al. | |
| 5,140,584 A | 8/1992 | Suzuki | |
| 5,157,659 A | 10/1992 | Schenkel | |
| 5,197,061 A | 3/1993 | Halbert-Lassalle et al. | |
| 5,214,646 A | 5/1993 | Yacoby | |
| 5,228,025 A | 7/1993 | Le Floch et al. | |
| 5,231,634 A | 7/1993 | Giles et al. | |
| 5,268,900 A * | 12/1993 | Hluchyj et al. | 370/429 |
| 5,274,629 A | 12/1993 | Helard et al. | |
| 5,280,480 A | 1/1994 | Pitt et al. | |
| 5,307,376 A | 4/1994 | Castelain et al. | |
| 5,339,313 A | 8/1994 | Ben-Michael et al. | |
| 5,343,473 A | 8/1994 | Cidon et al. | |
| 5,384,777 A | 1/1995 | Ahmadi et al. | |
| 5,416,801 A | 5/1995 | Chouly et al. | |
| 5,426,646 A | 6/1995 | Slack | |
| RE35,001 E | 7/1995 | Grow | |
| 5,432,848 A | 7/1995 | Butter et al. | |
| 5,436,905 A | 7/1995 | Li et al. | |
| 5,448,565 A | 9/1995 | Chang et al. | |
| 5,452,288 A | 9/1995 | Rahuel et al. | |
| 5,452,322 A | 9/1995 | Lauer | |
| 5,473,602 A | 12/1995 | McKenna et al. | |
| 5,481,535 A | 1/1996 | Hershey | |
| 5,483,529 A | 1/1996 | Baggen et al. | |
| 5,488,632 A | 1/1996 | Mason et al. | |
| 5,504,747 A | 4/1996 | Sweazey | |
| 5,515,379 A | 5/1996 | Crisler et al. | |
| 5,524,027 A | 6/1996 | Huisken | |
| 5,537,414 A | 7/1996 | Takiyasu et al. | |
| 5,541,922 A | 7/1996 | Pyhalammi | |
| 5,548,649 A | 8/1996 | Jacobson | |
| 5,555,268 A | 9/1996 | Fattouche et al. | |
| 5,563,883 A | 10/1996 | Cheng | |
| 5,563,897 A | 10/1996 | Pyndiah et al. | |
| 5,568,476 A | 10/1996 | Sherer et al. | |
| 5,610,908 A | 3/1997 | Shelswell et al. | |
| 5,612,975 A | 3/1997 | Becker et al. | |
| 5,615,212 A | 3/1997 | Ruszczyk et al. | |
| 5,619,651 A | 4/1997 | Young | |
| 5,623,512 A | 4/1997 | Sasaki | |
| 5,627,829 A | 5/1997 | Gleeson et al. | |
| 5,629,948 A | 5/1997 | Hagiwara et al. | |
| 5,636,230 A | 6/1997 | Marturano et al. | |
| 5,644,576 A | 7/1997 | Bauchot et al. | |
| 5,651,009 A | 7/1997 | Perreault et al. | |
| 5,694,389 A | 12/1997 | Seki et al. | |
| 5,706,348 A | 1/1998 | Gray et al. | |
| 5,717,689 A | 2/1998 | Ayanoglu | |
| 5,732,113 A | 3/1998 | Schmidl et al. | |
| 5,737,330 A | 4/1998 | Fulthorp et al. | |
| 5,745,769 A | 4/1998 | Choi | |
| 5,757,766 A | 5/1998 | Sugita | |
| 5,757,770 A | 5/1998 | Lagoutte et al. | |
| 5,764,931 A | 6/1998 | Schmahl et al. | |
| 5,771,235 A | 6/1998 | Tang et al. | |
| 5,787,071 A | 7/1998 | Basso et al. | |
| 5,790,541 A | 8/1998 | Patrick et al. | |
| 5,793,307 A | 8/1998 | Perreault et al. | |
| 5,799,033 A | 8/1998 | Baggen | |
| 5,812,599 A | 9/1998 | Van Kerckhove | |
| 5,818,821 A | 10/1998 | Schurig | |
| 5,818,826 A | 10/1998 | Gfeller et al. | |
| 5,825,807 A | 10/1998 | Kumar | |
| 5,828,677 A | 10/1998 | Sayeed et al. | |
| 5,841,778 A | 11/1998 | Shaffer et al. | |
| 5,841,873 A | 11/1998 | Lockhart et al. | |
| 5,884,040 A | 3/1999 | Chung | |
| 5,886,993 A | 3/1999 | Ruszczyk et al. | |
| 5,892,769 A | 4/1999 | Lee | |
| 5,896,561 A | 4/1999 | Schrader et al. | |
| 5,903,614 A | 5/1999 | Suzuki et al. | |
| 5,914,932 A | 6/1999 | Suzuki et al. | |
| 5,914,959 A | 6/1999 | Marchetto et al. | |
| 5,940,399 A | 8/1999 | Weizman | |
| 5,940,438 A | 8/1999 | Poon et al. | |
| 5,948,060 A | 9/1999 | Gregg et al. | |
| 5,956,338 A | 9/1999 | Ghaibeh | |
| 5,966,412 A | 10/1999 | Ramaswamy | |
| 5,970,062 A | 10/1999 | Bauchot | |
| 5,987,011 A | 11/1999 | Toh | |
| 5,999,534 A * | 12/1999 | Kim | 370/395.42 |
| 6,005,894 A | 12/1999 | Kumar | |
| 6,006,017 A | 12/1999 | Joshi et al. | |
| 6,041,063 A | 3/2000 | Povlsen et al. | |
| 6,041,358 A | 3/2000 | Huang et al. | |
| 6,044,154 A | 3/2000 | Kelly | |
| 6,044,482 A | 3/2000 | Wong | |
| 6,052,377 A | 4/2000 | Ohmi et al. | |
| 6,076,115 A | 6/2000 | Sambamurthy et al. | |
| 6,092,214 A | 7/2000 | Quoc et al. | |
| 6,097,703 A | 8/2000 | Larsen et al. | |
| 6,098,179 A | 8/2000 | Harter, Jr. | |
| 6,108,713 A | 8/2000 | Sambamurthy et al. | |
| 6,125,150 A | 9/2000 | Wesel et al. | |
| 6,130,887 A | 10/2000 | Dutta | |
| 6,130,894 A | 10/2000 | Ojard et al. | |
| 6,151,296 A | 11/2000 | Vijayan et al. | |
| 6,169,744 B1 | 1/2001 | Grabelsky et al. | |
| 6,182,147 B1 | 1/2001 | Farinacci | |
| 6,188,717 B1 | 2/2001 | Kaiser et al. | |
| 6,192,397 B1 | 2/2001 | Thompson | |
| 6,195,331 B1 * | 2/2001 | Tani | 370/230 |
| 6,201,793 B1 * | 3/2001 | Chen et al. | 370/238 |
| 6,202,082 B1 | 3/2001 | Tomizawa et al. | |
| 6,215,792 B1 | 4/2001 | Abi-Nassif | |
| 6,216,244 B1 | 4/2001 | Myers et al. | |
| 6,222,851 B1 | 4/2001 | Petry | |
| 6,243,386 B1 | 6/2001 | Chan et al. | |
| 6,243,449 B1 | 6/2001 | Margulis et al. | |
| 6,246,691 B1 * | 6/2001 | Briem et al. | 370/412 |
| 6,246,770 B1 | 6/2001 | Stratton et al. | |
| 6,252,849 B1 | 6/2001 | Rom et al. | |
| 6,259,696 B1 | 7/2001 | Yazaki et al. | |
| 6,263,445 B1 | 7/2001 | Blumenau | |
| 6,278,685 B1 | 8/2001 | Yonge, III et al. | |
| 6,278,716 B1 | 8/2001 | Rubenstein et al. | |
| 6,289,000 B1 | 9/2001 | Yonge, III | |
| 6,295,296 B1 | 9/2001 | Tappan | |
| 6,334,185 B1 | 12/2001 | Hansson et al. | |
| 6,343,083 B1 | 1/2002 | Mendelson et al. | |
| 6,345,310 B1 | 2/2002 | Allison et al. | |
| 6,363,052 B1 | 3/2002 | Hosein | |
| 6,370,156 B2 | 4/2002 | Spruyt et al. | |
| 6,385,672 B1 | 5/2002 | Wang et al. | |
| 6,397,368 B1 | 5/2002 | Yonge, III et al. | |
| 6,421,725 B1 | 7/2002 | Vermilyea et al. | |
| 6,430,192 B1 | 8/2002 | Creedon et al. | |
| 6,430,661 B1 | 8/2002 | Larson et al. | |
| 6,434,153 B1 | 8/2002 | Yazaki et al. | |
| 6,442,129 B1 | 8/2002 | Yonge, III et al. | |
| 6,456,649 B1 | 9/2002 | Isaksson et al. | |
| 6,466,580 B1 | 10/2002 | Leung | |
| 6,469,992 B1 | 10/2002 | Schieder | |
| 6,473,435 B1 | 10/2002 | Zhou et al. | |
| 6,480,489 B1 | 11/2002 | Muller et al. | |
| 6,487,212 B1 | 11/2002 | Erimli et al. | |
| 6,501,760 B1 | 12/2002 | Ohba et al. | |

| | | | |
|---|---|---|---|
| 6,519,263 B1 | 2/2003 | Huth | |
| 6,526,451 B2 | 2/2003 | Kasper | |
| 6,538,985 B1 | 3/2003 | Petry et al. | |
| 6,553,534 B2 | 4/2003 | Yonge, III et al. | |
| 6,567,914 B1 | 5/2003 | Just et al. | |
| 6,654,410 B2 | 11/2003 | Tzannes | |
| 6,667,991 B1 | 12/2003 | Tzannes | |
| 6,671,284 B1 | 12/2003 | Yonge, III et al. | |
| 6,747,976 B1 | 6/2004 | Bensaou et al. | |
| 6,765,885 B2 | 7/2004 | Jiang et al. | |
| 6,778,507 B1 | 8/2004 | Jalali | |
| 6,789,128 B1 | 9/2004 | Harrison et al. | |
| 6,868,087 B1 * | 3/2005 | Agarwala et al. | 370/412 |
| 2001/0012319 A1 | 8/2001 | Foley | |
| 2001/0043576 A1 | 11/2001 | Terry | |
| 2001/0048692 A1 | 12/2001 | Karner | |
| 2002/0001314 A1 | 1/2002 | Yi et al. | |
| 2002/0012320 A1 | 1/2002 | Ogier et al. | |
| 2002/0042836 A1 | 4/2002 | Mallory | |
| 2002/0048368 A1 | 4/2002 | Gardner | |
| 2002/0065047 A1 | 5/2002 | Moose | |
| 2002/0126690 A1 * | 9/2002 | Narayana et al. | 370/444 |
| 2002/0131591 A1 | 9/2002 | Henson et al. | |
| 2002/0154650 A1 * | 10/2002 | Floyd | 370/412 |
| 2002/0191533 A1 | 12/2002 | Chini et al. | |
| 2003/0006883 A1 | 1/2003 | Kim et al. | |
| 2003/0033491 A1 * | 2/2003 | Henry et al. | 711/154 |
| 2003/0079169 A1 | 4/2003 | Ho et al. | |
| 2003/0172104 A1 * | 9/2003 | Hooman et al. | 709/103 |
| 2003/0174664 A1 | 9/2003 | Benveniste | |
| 2003/0217182 A1 | 11/2003 | Liu et al. | |
| 2003/0231652 A1 | 12/2003 | Sprague et al. | |
| 2003/0231658 A1 | 12/2003 | Liang et al. | |

FOREIGN PATENT DOCUMENTS

| | | |
|---|---|---|
| WO | 98/57440 | 12/1998 |
| WO | WO00/72495 | 11/2000 |
| WO | 02/41598 | 5/2002 |

OTHER PUBLICATIONS

HomePlug Powerline Alliance, HomePlug 1.0.1 Specification, Dec. 1, 2001.
Sun et al., Public-key ID-based Cryptosystem, 1991, IEEE, pp. 142-144.
Bruschi, Danilo, Secure Multicast in Wireless Networks of Mobile Hosts: Protocols and Issues, 2002, Mobile Networks and Applications, pp. 503-511.
IBM, Combined use of collision resolution and collision avoidance MAC protocols, Oct. 1, 1994, IBM Technical Disclosure Bulletin, vol. 37, pp. 299-302 (NN9410299).
ISO/IEC 8802-3: 2002 International Standard (ANSI/IEEE Std 802.3) Carrier sense multiple access with collision detection (CSMA/CD) access method and physical layer specifications.
ISO/IEC 8802-11: 1999 International Standard (ANSI/IEEE Std 802.11) Wireless LAN Medium Access Control (MAC) and Physical Layer (PHY) specifications.
Shared Wireless Access Protocol (Cordless Access) Specification, SWAP-CA Revision 1.21, Jan. 27, 1999, by the HomeRF™ Technical Committee.
Interface Specification for HomePNA™ 2.0—10M8 Technology, Dec. 1, 1999.
Interface Specification for HomePNA™ 2.0—10M8 Technology—Link Layer Protocols, Dec. 1, 1999.
Bux, "Token-Ring Local-Area Networks and Their Performance," Procs. Of the IEEE, vol. 77, No. 2, Feb. 1989.
Applied Cryptography, Second Edition: protocols, algorithms, and source code in C, Bruce Schneier, 1996.
PKCS #5 v. 20: Password-Based Cryptography Standard, RSA Laboratories, Mar. 25, 1999.
Lee et al., "HomePlug 1.0 powerline communication LANs—protocol description and performance results", Int. J. Commun. Syst., vol. 16 (2003).
Carrier sense multiple access with collision detection (CSMA/CD) access method and physical layer specifications, ISO/IEC 8802-3: 1996 International Standard (ANSI/IEEE Std 802.3).
Bertsekas et al., Data Networks, Prentice Hall, Englewood Cliffs, NJ, Section 2.4.3 Selective Repeat ARQ (1992).
HiPerformance Radio Local Area Network (HiperLAN) Type I: Functional Specification, European Standard (Telecommunication Series) No. 300652 V. 1.2.1 Jul. 1998.
An Architecture for Differentiated Services, IETF RFC 2475, Dec. 1998.
Goalic et al., "Real-Time Turbo-Decoding of Product Codes on a Digital Signal Processor," IEEE, pp. 624-628 (1997).
Benedetto et al., "A Soft-Input Soft-Output Maximum A Posteriori (MAP) Module to Decode Parallel and Serial Concatenated Codes," TDA Progress Report 42-127, pp. 1-20 (Nov. 1996).
Peterson et al., "Error-Correcting Codes," The MIT Press (1972).
Pyndiah, "Near-Optimum Decoding of Product Codes: Block Turbo Codes," IEEE Transactions on Communications, vol. 46, No. 8, pp. 1003-1010 (Aug. 1998).
Pyndiah, "Near Optimum Decoding of Product Codes," IEEE, pp. 339-343 (1994).
Pyndiah, "Performance of Block Turbo Coded 16-QAM and 64-QAM Modulations," IEEE, pp. 1039-1043 (1995).
Ehrsam et al., "A cryptographic key management scheme for implementing the Data Encryption Standard," IBM Syst J, vol. 17, No. 2 (1978).
Kamerman, A; Aben, G; Net throughput with IEEE 802.11 wireless LANs; Wireless Communications and Networking Conference, 2000. WCNC 2000 IEEE, vol. 2, Sep. 23-28, 2000; pp. 747-752.
Dube, P.; Altman, E.; Queueing analysis of early message discard policy; Communications, 2002. ICC 2002. IEEE International Conference, vol. 4, Iss., 2002, pp. 2426-2430.

* cited by examiner

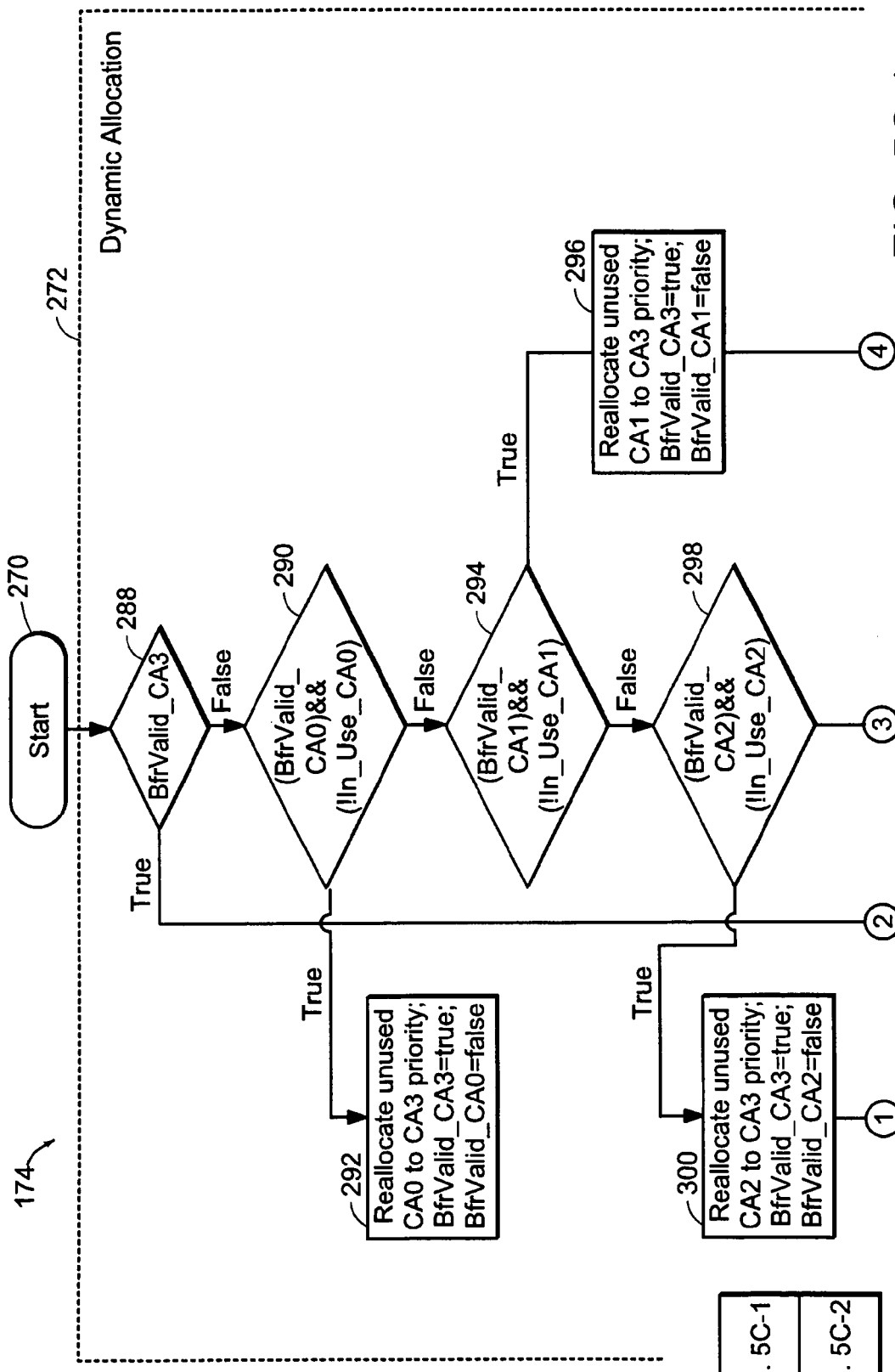

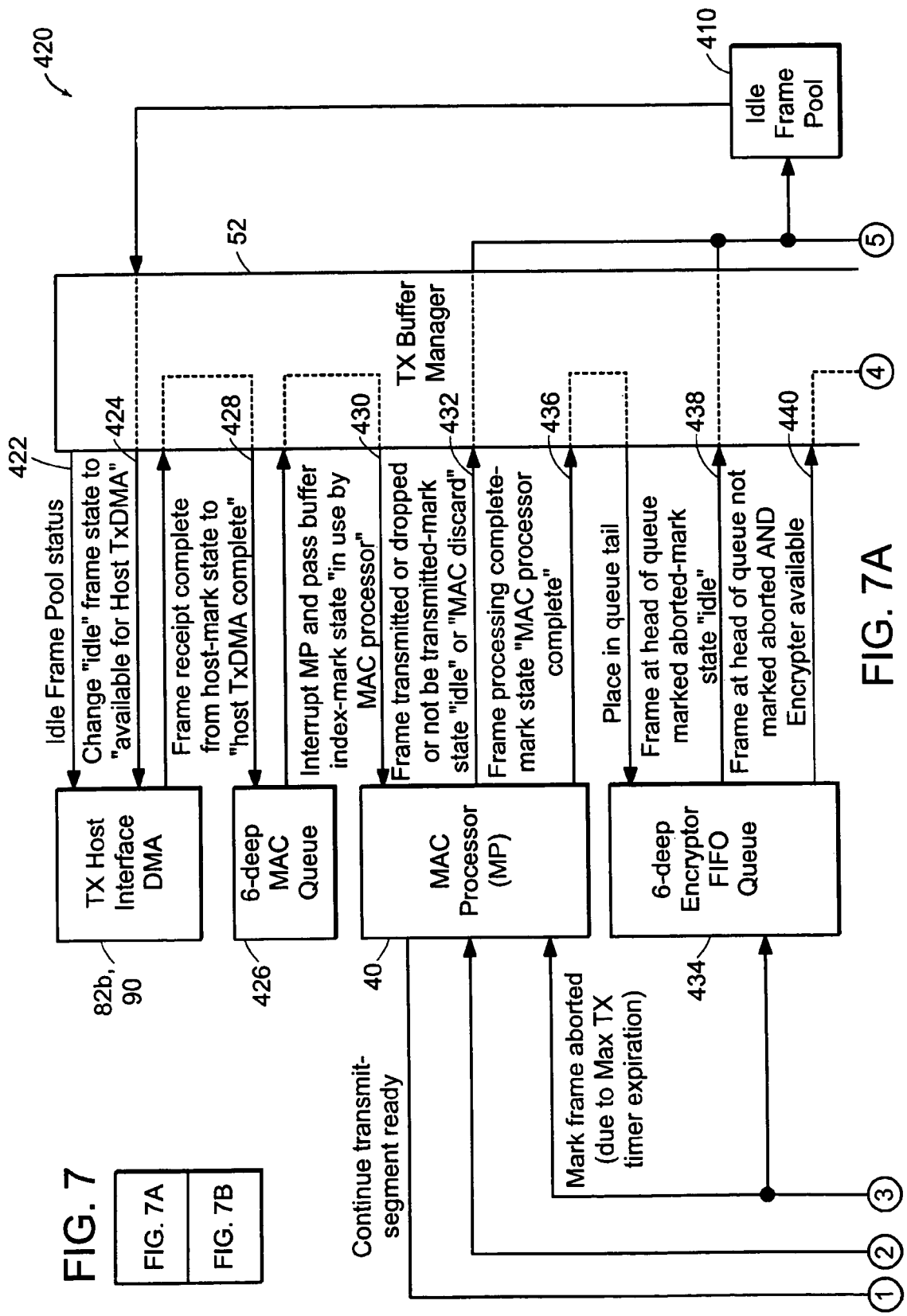

COMMUNICATION BUFFER SCHEME OPTIMIZED FOR VOIP, QOS AND DATA NETWORKING OVER A POWER LINE

BACKGROUND

The invention relates to management of buffers in communications devices that transmit and receive prioritized network traffic.

The IEEE 802.1D Standard describes the use of user priorities and access priorities in a network environment. User priorities are priorities that a user of an application requests be associated with its traffic. Access priorities are the number of differentiated traffic classes that a Media Access Control (MAC) sublayer device provides. The IEEE 802.1D Standard provides a mapping of the user priorities to the traffic classes.

In MAC transceivers that implement access priorities to control channel access, Quality of Service (QoS) performance for the different classes of traffic can be greatly impacted by conventional receive and transmit buffering techniques. For example, the use of the same buffer for multiple access priorities can cause priority blocking to occur, e.g., higher priority traffic is blocked by lower priority traffic. Also, if buffer capacity is limited and buffers become congested, processing of lower priority traffic may be aborted to make way for higher priority traffic.

SUMMARY

In one aspect, the invention provides methods and apparatus, including computer program products, for operating a MAC receiver device. The methods include providing a group of receive buffers associated with priority levels at which frame segments are received, and allocating receive buffers in the group for reception of frame segments based on the priority levels.

Embodiments of the invention may include one or more of the following features.

The method can further include filling the receive buffers with the frame segments based on the priority levels and dispatching the filled receive buffers for delivery to a host interface in order of highest to lowest of the priority levels.

The method can further include maintaining an empty buffer pool of empty buffers. Allocating can include moving empty buffers from the empty buffer pool to the receive buffers group for use as receive buffers in the reception of frame segments.

Allocating can further include re-allocating the receive buffers within the receive buffers group in order of highest to lowest of the priority levels when no empty buffer is available in the empty buffer group.

Re-allocating can include performing a static re-allocation to re-allocate an unused buffer from a lower priority to a higher of the priority levels within the receive buffers group. Re-allocating can further include performing a dynamic re-allocation that attempts to reallocate first an unused, and then a used, buffer from a lower to a higher of the priority levels within the receive buffers group at such time as it is determined that a frame segment is to be received.

In another aspect, the invention provides methods and apparatus, including computer program products, for operating a MAC transmitter device. The methods include delivering completed transmit buffers queued in a multi-level priority queue to a PHY interface in priority order.

Embodiments of the invention may include one or more of the following features.

Delivering can include determining that the multi-level priority queue includes a first transmit buffer that is of a higher priority than a second transmit buffer that being prepared for transmit, generating a priority-based interruption to cause the transmit preparation of the second transmit buffer (lower priority) to be suspended and preparing the first transmit buffer (higher priority) for transmit.

Particular implementations of the invention may provide one or more of the following advantages.

The priority-based buffering routes high priority traffic to the front of the queue, thereby reducing latency (and thus improving QoS). The receive allocation mechanism allocates buffer resources strictly on a fixed priority basis, further improving QoS performance in a congested network. The transmit buffering mechanism improves transmit QoS performance, eliminates aborted transmit buffer due to mixed priority and reduces the transmission latency of higher priority buffers. Further, the transmit buffering mechanism eliminates low priority, low data rate, maximum length frames from being "deadlocked". A deadlocked condition occurs when, for example, high priority frames are delivered by a host interface to a PHY interface at a constant rate shorter than the transmit time of a maximum length frame, causing perpetual aborting of the lower priority frame.

Other features and advantages of the invention will be apparent from the following detailed description and from the claims.

DETAILED DESCRIPTION

Figure 1:
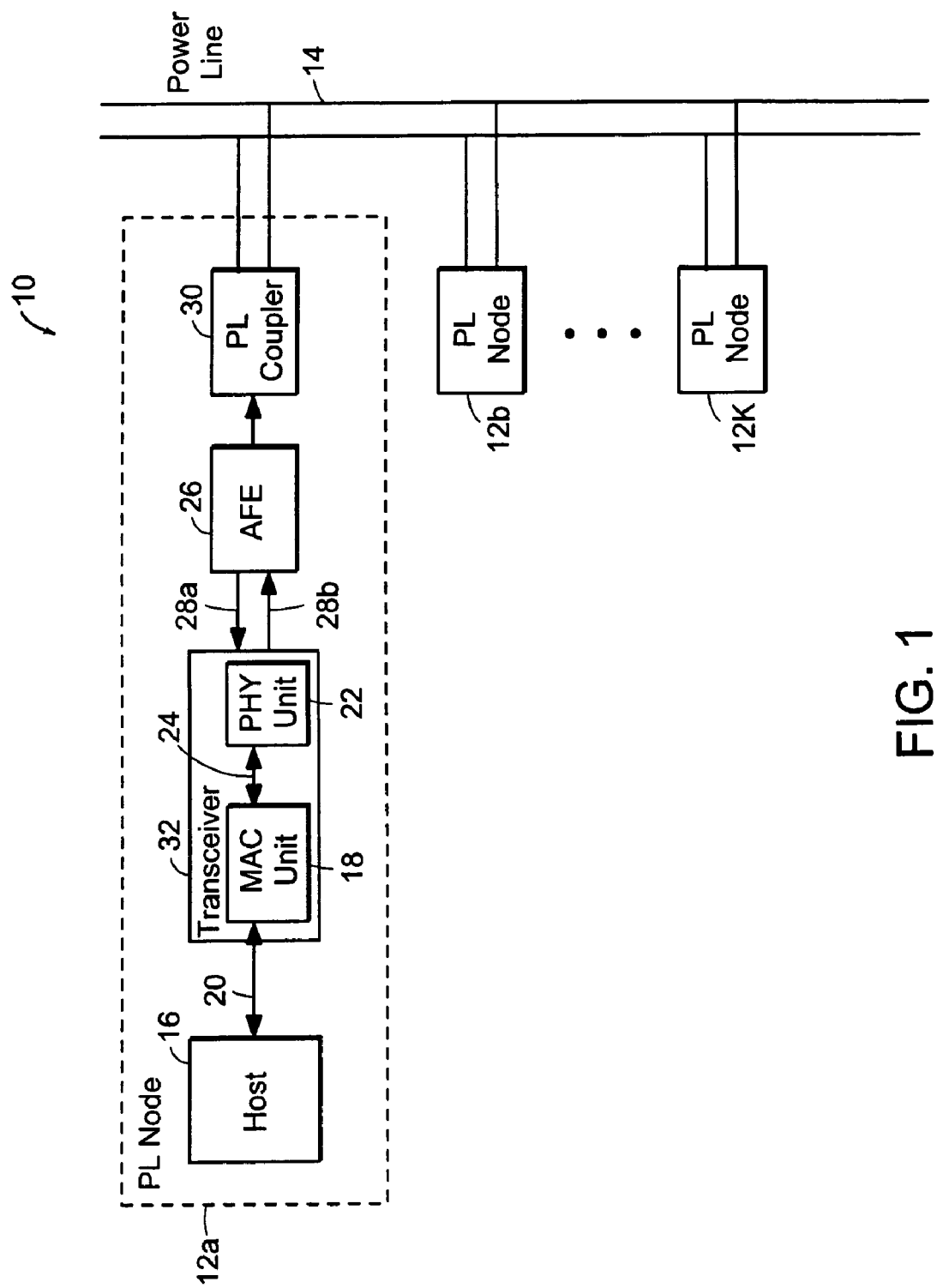
FIG. 1 is a block diagram of a power line network.

Referring to FIG. 1, a network 10 includes network nodes 12a, 12b, . . . 12k coupled to a transmission medium or channel 14, e.g., a power line (PL), as shown. During a communication between at least two of the network nodes 12 over the transmission medium 14, a first network node, for example, 12a, serves as a transmitting network node (or transmitter) and at least one second network node, for example, 12b, serves as a receiving network node (or receiver). Each network node 12 includes a host unit (or host) 16. The network node 12 further includes a media access control (MAC)

unit 18 connected to the host 16 by a data interface 20, a physical layer (PHY) unit 22 connected to the MAC unit 18 by a MAC-to-PHY I/O bus 24 and an analog front-end (AFE) unit 26. The AFE unit 26 connects to the PHY unit 22 by separate AFE input lines 28a and output lines 28b, as well as connects to the transmission medium 14 by an AFE-to-PL interface or coupler 30. The host 16 is intended to represent any device that uses the units 18, 22, 26 and 30 to communicate with any other node on the PL network 10, or other network to which the PL network 10 may be connected. The units 16, 18, 22, 26, 30 may reside in a single system "box", for example, a desktop computer with a built-in network interface, or may reside in separate boxes, e.g., units 18, 22, 26 30 could reside in a separate network adapter that connects to a host device. The functionality of units 18 and 22 may be integrated in a single, transceiver 32 (as shown). Each node 12 represents any combination of hardware, software, and firmware that appears to other nodes as a single functional and addressable unit on the network.

Generally, the MAC and PHY units conform to the Open System Interconnect (OS) Model. More particularly, the MAC unit conforms to the OSI Model's data link MAC sublayer and the PHY layer unit to the OSI Model's physical layer. The MAC unit 18 performs data encapsulation/decapsulation, as well as media access management for transmit (TX) and receive (RX) functions. Preferably, the MAC unit 18 employs a collision avoidance medium access control scheme like carrier sense multiple access with collision avoidance (CSMA/CA) as described by the IEEE 802.11 standard, although other suitable MAC protocols of the collision avoidance type or other MAC protocol types may be used. The MAC unit 18 also provides Automatic Repeat request (ARQ) protocol support. The PHY unit 22 performs transmit encoding and receive decoding, modulation/demodulation, among other functions.

Preferably, the unit of communication exchanged between nodes is in the form of a packet. The term "packet" may refer to a PHY layer protocol data unit (PDU). A packet may include data, i.e., payload or "MAC frame" (or, simply, "frame") in conjunction with a delimiter, or a delimiter by itself. Preferably, the delimiter is a combination of preamble and frame control information. A MAC Service Data Unit (MSDU) may refer to any information that the MAC unit 18 has been tasked to transport by upper OSI layers (those OSI layers to which the MAC layer provides services), along with any MAC management information supplied by the MAC unit 18. The payload can have a maximum length in time (for latency considerations) and a varying byte capacity determined by length and channel conditions. Therefore, the payload may have the capacity to contain an entire MSDU or only a segment of the MSDU.

Preferably, packets are transmitted and received by the PHY layer unit 22, as well as processed by the MAC unit 18, in accordance with techniques described in U.S. Pat. No. 6,397,368, entitled "Forward Error Correction With Channel Estimation," in the name of Lawrence W. Yonge III et al., U.S. Pat. No. 6,442,129, entitled "Enhanced Channel Estimation," in the name of Lawrence W. Yonge III et al., U.S. Pat. No. 6,289,000 entitled "Frame Control Encoder/Decoder for Robust OFDM Frame Transmissions," in the name of Lawrence W. Yonge III, co-pending U.S. application Ser. No. 09/632,303, entitled "Media Access Control Protocol With Priority and Contention-Free Intervals," in the name of Lawrence W. Yonge III, and U.S. Pat. No. 6,278,685, entitled "Robust Transmission Mode", in the name of Lawrence W. Yonge III et al., all of which are incorporated herein by reference; however, other techniques may be used. The aforementioned U.S. Pat. No. 6,278,685 ("Robust Transmission Mode") describes a standard mode and a reduced data rate robust mode (hereinafter, simply referred to as "ROBO mode"), the ROBO mode providing for extensive diversity (in time and frequency) and data redundancy to improve the ability of the network stations to operate under adverse conditions.

Generally, the MAC unit 18 supports standard MAC functions, such as framing. It also ensures Quality of Service through a number of different mechanisms, for example, mechanisms such as those described in the above-referenced application Ser. No. 09/632,303. In particular, the CSMA/CA protocol is optimized for a multi-level priority scheme that controls delay for data types requiring better than best effort delivery. In the described embodiment, four contention-based channel access priority levels are supported: CA3, CA2, CA1 and CA0. The highest priority is indicated by CA3=0b11 and the lowest priority is indicated by CA0=0b00. The five differentiated traffic classes described therein, i.e., those corresponding to the four channel access priorities (CA0 through CA3), and contention free access, correspond, one to one, to traffic classes 0 through 4 of IEEE Standard 802.1D.

The MAC unit 18 further provides for reliable frame delivery. Preferably, it supports rate adaptive PHY characteristics and channel estimation control between each transmitter/receiver to establish PHY modulation parameters that are optimized for channel conditions in each direction. Also, preferably, ARQ is used to ensure delivery for unicast transmissions. The receipt of certain frame types requires acknowledgment by the receiver and ARQ uses different types of acknowledgments. The acknowledgment can be positive or negative depending on the status of the received frame. A correctly addressed frame with a valid PHY frame Check Sequence causes the receiver to transmit a positive acknowledgment (or "ACK") response to the originator. Transmitting nodes attempt error recovery by retransmitting frames that are known or are inferred to have failed. Failures occur due to collisions or bad channel conditions, or lack of sufficient resources at the receiver. Transmissions are known to have failed if a "NACK" (in the case of bad channel conditions) or "FAIL" (in the case of insufficient resources) response is received. Transmissions are inferred to have failed for some other reason (for example, due to collisions) if no response is received when one is expected. In addition to the unicast ARQ, a "partial ARQ" is used for increased reliability of multicast and broadcast transmissions at the MAC level. The "partial ARQ" allows a transmitter to know that at least one node received the frame.

As mentioned above, the MAC unit 18 can support segmentation/reassembly. The process of partitioning MSDUs from the host into smaller MAC frames is referred to as segmentation. The reverse process is called reassembly. Segmentation improves chances of frame delivery over harsh channels and contributes to better latency characteristics for stations of higher priority. All forms of addressed delivery (unicast, multicast, broadcast) may be subject to segmentation. An MSDU arriving at the MAC unit 18 is placed in one or more segments depending on the size of the MSDU and the data rate the link will sustain. Every effort is made to transmit all of the segments of a single MSDU in a single, continuous burst of MAC frames. Acknowledgments and retransmissions occur independently for each segment.

Figure 2:
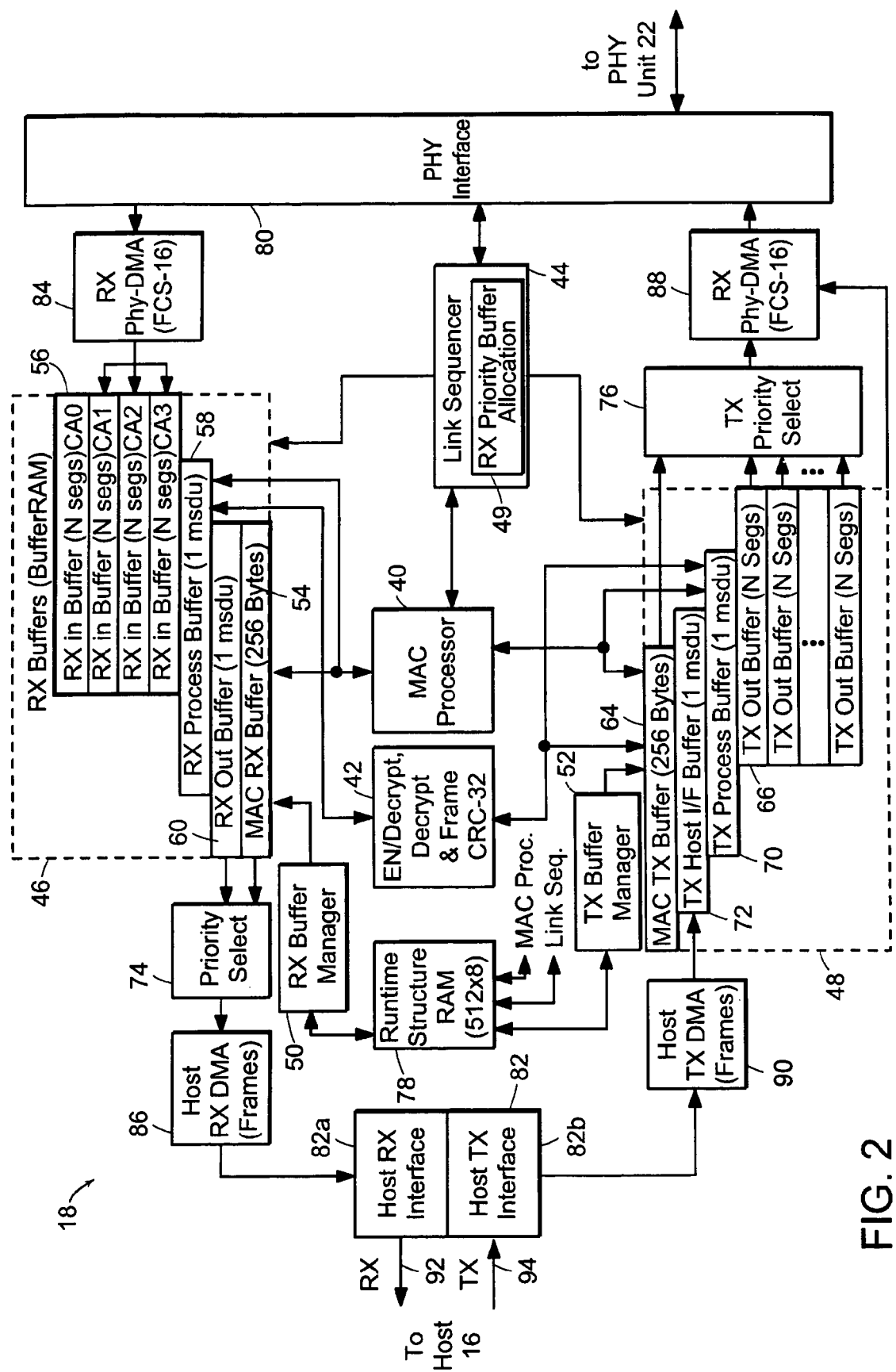
FIG. 2 is a block diagram of a Medium Access Control (MAC) unit in each node of the power line network of FIG. 1.

Referring to FIG. 2, an architectural representation of the MAC unit 18 is shown. The MAC unit 18 includes a MAC Processor 40, an Encryptor/Decryptor 42 and a Link Sequencer 44. Coupled to these three functional blocks are buffer memories 46 and 48. Buffer memory 46 is an RX buffer memory and the buffer memory 48 is a TX buffer memory. The RX buffer memory 46 and TX buffer memory 48 are managed by an RX Buffer Manager 50 and a TX Buffer Manager 52, respectively. The Link Sequencer performs, among other processes, an RX priority based buffer re-allocation 49, as will be described later with reference to FIGS. 5A-5F.

In the described embodiment, the RX buffer memory 46 includes seven RX buffers, including six general purpose buffers and one MAC-owned buffer 54. The MAC RX Buffer 54 is allocated and used by the MAC Processor 40 for MAC generated receive frames destined for the host. After the MAC Processor 40 creates a receive host frame in the MAC RX buffer 54, the MAC RX buffer 54 is treated in a similar fashion to the general purpose buffers. The general purpose buffers are initialized to an "idle" state by the MAC Processor 40, with subsequent control under the RX Buffer Manager 50. As many as four of the general purpose RX buffers can be used as an "RX In Buffer" 56 to store segments received from the power line 14 via the PHY unit 22. One buffer, an RX Process Buffer 58, can be used for storing data being processed by the Encryptor/Decryptor 42 (in decryption mode) and MAC Processor 40. As many as six of the general purpose buffers can be used as an RX Out Buffer 60, to store post-processed data to be sent to the host.

The structure of the TX buffer memory 48 is quite similar to that of the RX buffer memory 46. The TX buffer memory 48 also includes one MAC TX Buffer 64, and six general purpose buffers, six of which can be used as a TX Out Buffer 66. One of the buffers can be used as a TX Process Buffer 70. One of the buffers can be used as a TX Host Interface buffer 72 as well.

The buffer memories 46, 48 are optimized for the multi-level channel access prioritization discussed earlier. To support the prioritization of the buffer memories, the MAC unit 18 further includes an RX Priority Selector 74 and a TX Priority Selector 76, as will be described later. The memories can be implemented within a single RAM or multiple RAMs.

The MAC Processor 40, the Link Sequencer 44, the Encryptor/Decryptor 42 and Buffer Managers 50, 52 each are coupled to a Runtime Structure RAM 78. The MAC unit 18 further includes a PHY interface 80 for coupling to the PHY unit 22 and a Host Interface 82 for coupling to the host 16. The Host Interface 82 includes a Host RX Interface 82a and a Host TX Interface 82b. The MAC unit 18 includes two RX DMA engines, one for the PHY side, that is, an RX PHY-DMA engine 84, and one for the host side, a Host RX DMA engine 86. Similarly, to support transmit functions, the MAC 18 includes a TX PHY-DMA engine 88 on the PHY side and a Host TX DMA engine 90 on the host interface side. The RX PHY-DMA engine 84 moves frame data from the PHY interface 80 to one of the RX In Buffers 56 in the RX buffer memory 46. The Host RX DMA engine 86 moves data selected by the RX Priority Selector 74 from the RX Out Buffer 60 (or MAC RX buffer 54) in the RX buffer memory 46 directly to the Host RX Interface 82a. The Host RX Interface 82a passes the read data as an output to the host 16 (FIG. 1) on an RX bus 92. The Host TX Interface 82b receives data from the host 16 over a TX bus 94 and stores the TX data in the TX Host Interface Buffer 72, which is coupled to the Host TX Interface 82 and the Host TX DMA engine 90. The Host TX DMA engine 90 manages the transfer of TX frame data from the Host TX Interface 82b to the TX Host Interface Buffer 72. Buffered data selected by the TX Priority Selector 76 is transferred between the TX buffer memory 48 (that is, from one of the TX Out Buffers 66 or the MAC TX Buffer 64) and the PHY Interface 80 by the TX PHY-DMA Engine 88.

During transmit, the MAC Processor 40 operates on requests made by the host 16. The Encryptor 42 performs an encryption process on any MSDUs (processed by the MAC Processor 40) that require encryption. Once encrypted, the Link Sequencer 44 segments MSDUs by partitioning the frame body into segments based on a maximum segment (or frame) size (or other parameters) until the last segment. The Link Sequencer 44 also initiates a transmission or transmission attempt using channel contention with priority, as discussed above.

During receives, the Link Sequencer 44 receives RX segments which can be RX encrypted segments (RES) or cleartext. It parses frame control information of any incoming segments, as well as receives the body of any incoming segments, saves information about the channel characteristics and reassembles the segments. The Link Sequencer 44 accumulates segments until an entire frame is assembled. All segments are reassembled prior to decryption to extract the MSDU. The MSDU or RX encrypted frame (REF) or RX cleartext frame (RCF) is then passed to the Decryptor 42.

The Decryptor 42 receives the reassembled frame from the Link Sequencer and, if the frame is encrypted, retrieves an appropriate network encryption key and used the key to decrypt the frame to generate the RCF. The Decryptor 42 determines if there are any errors in the RCF. If there are no errors detected by the Decryptor 42 for the RCF, the Decryptor 42 provides the RCF to the MAC Processor 40.

The MAC Processor 40 parses and processes the cleartext frame body. It determines the type of frame body from the type value specified in the first occurring type field. If the frame data to follow is MSDU data, the type field and the frame data, along with the DA field and the SA field are provided to the Host 16 (FIG. 1) for further processing. Otherwise, the frame data comprises MAC management information, and the MAC Processor 40 performs MAC management processing related tasks according to the MAC management information.

As indicated earlier, the MAC unit 18 implements RX and TX buffering with prioritization to optimize transmission and processing of the priorities-based traffic. The RX buffering is designed to improve receive QoS performance, reduce the occurrence of power line FAIL responses and increase buffering capacity for bursty traffic. In particular, the RX buffering allocates the RX In Buffers 56 in priority order and delivers completed buffers to the Host RX Interface 82a in priority order.

Figure 3A:
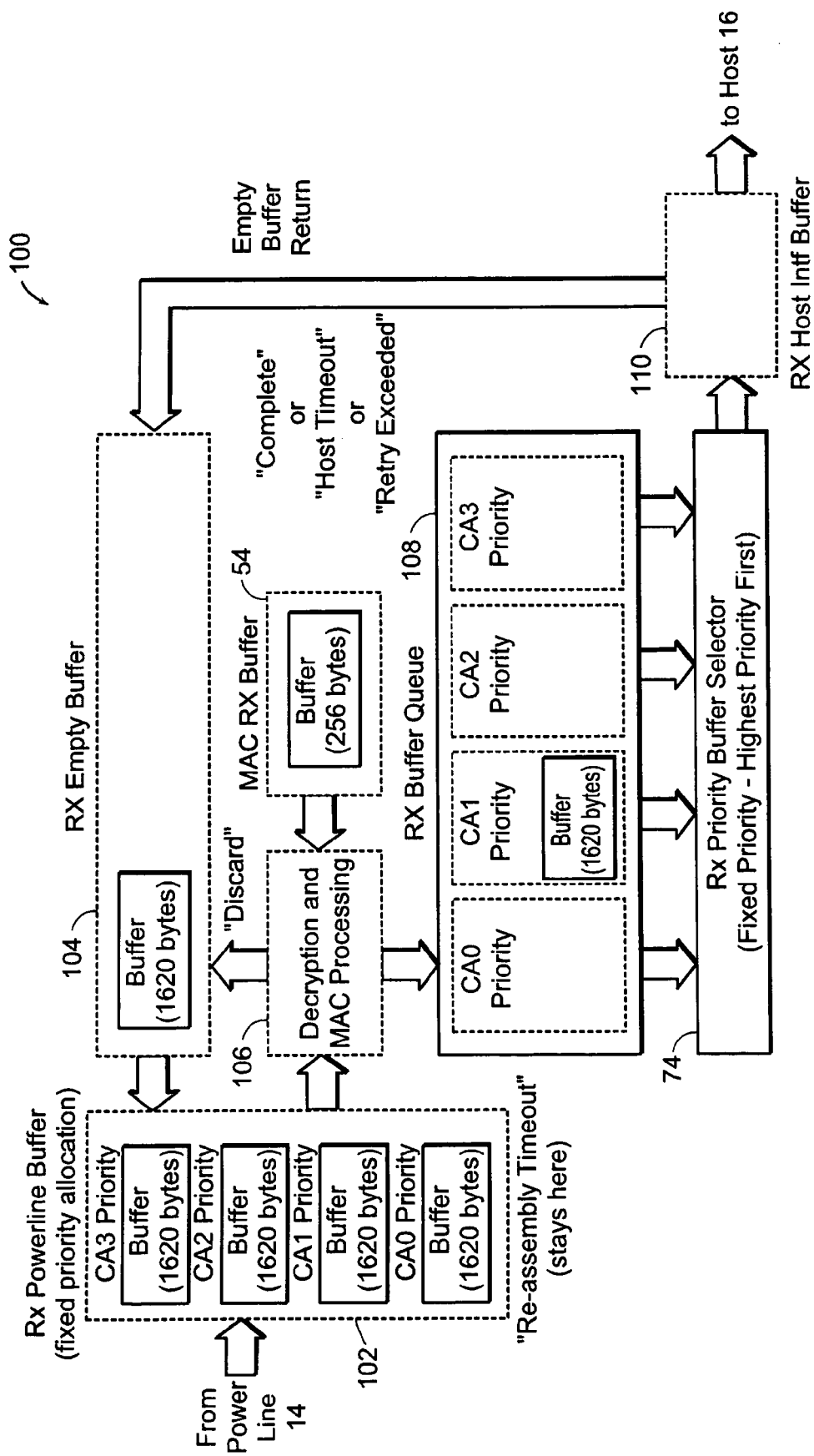
FIGS. 3A-3D are block diagrams depicting receive (RX) buffer flow for RX buffers in a multi-priority RX buffer scheme within the MAC unit of FIG. 2.

As shown in the exemplary RX buffer flows 100 of FIG. 3A, the general purpose RX buffers of the RX Buffer Memory 46 are organized into five groups: 1) an RX power line buffer group 102; 2) an RX empty buffer group 104; (3) an RX decryption/MAC processing buffer group 106; 4) an RX buffer queue group 108; and 5) an RX host interface buffer group 110. The power line buffer group 102 includes zero to four buffers (corresponding to the RX In Buffers 56, FIG. 2) to be used by the Link Sequencer 44 for receiving MSDUs from the power line (via the PHY unit 22 and PHY interface 80). The empty buffer group 104 includes zero to six empty buffers waiting to be dispatched to the power line buffer group 102. The empty buffer group 104 attempts to keep the power line buffer group 102 full. The decryption/MAC processing buffer group 106 includes zero to one buffer (corresponding to the RX Process Buffer 58, FIG. 2) containing a completed MSDU that needs to be decrypted and further formatted, e.g., into an Ethernet receive frame. The buffer queue group 108 includes zero to six buffers (corresponding to the RX Out Buffers 60, FIG. 2) containing completed, formatted receive frames. The RX buffer queue group 108 is organized as four separate queues, one for each of the four priority levels, as shown. The host interface buffer group 110 includes zero to one buffer being used by the RX Host Interface 82 to transfer receive frames out to the host 16.

FIGS. 3A-3D illustrate buffer usage at various points of operating during a receive process. For the remaining discussion of the RX buffers, the MAC buffer is not referenced.

After power initialization, the empty buffer group 104 contains six empty buffers and all other groups contain zero buffers. The empty buffers are dispatched to the power line buffer group 102 one at a time until the power line buffer group 102 contains four buffers. At this point, the empty buffer group 104 contains the remaining two empty buffers. The power line buffer group 102 allocates buffers to MSDU reception on a fixed priority basis with the highest priority being allocated first. The priority allocation is organized into and is based on the four channel access priority levels: CA3 (highest priority); CA2; CA1 and CA0 (lowest priority). The CA3 priority level is reserved for CA3 MSDUs. The primary application target for this level is Voice over Internet Protocol (VoIP). The CA2 priority level is reserved for CA2 MSDUs. The primary application target for this level is audio and video streaming. The CA1 priority level is reserved for CA1 MSDUs. The primary application target for the CA1 priority level is interactive data transfer (i.e., internet "surfing"). The CA0 priority level is reserved for CA0 MSDUs. The primary application target for this level is non-interactive data transfer (i.e., file transfers).

When a power line buffer group buffer is filled by the Link Sequencer 44 with a completed MSDU reception, that buffer is dispatched to the decryption buffer group 106. The empty buffer group 104 attempts to dispatch a new empty buffer to the power line buffer group 102 to replace the one just released to the decryption buffer group 106. The buffer dispatched to the decryption buffer group 106 is further processed by the MAC Processor 40 and the Decryptor 42 before being dispatched to the buffer queue group 108. Buffers in the buffer queue group 108 are made available to the RX priority buffer selector 74. The RX priority selector 74 dispatches completed buffers (those containing completed frames) to the host interface buffer group 110 one at a time on a fixed priority basis. The host interface priority allocation is organized based on the following channel access priorities: CA3 first, CA2 second, CA1 third and CA0 last.

Referring to FIG. 3A, the receive buffer flow 100, illustrating RX buffer flow at the operational point in which the power line buffer group 102 has dispatched a CA1 buffer which has been decrypted, formatted and placed into the buffer queue group 108, is shown. The empty buffer group has dispatched a fourth buffer to the power line buffer group so that the power line buffer group 102 has four priority buffers. The empty buffer group contains one empty buffer, empty buffer 116. As the power line buffer group buffers are filled by the Link Sequencer 44 and dispatched to the Decryption/MAC processing buffer group and the buffer queue group, the buffer count of the buffer queue group 108 increases while the buffer count of the empty buffer group 104 decreases. The RX priority buffer selector 74 routes the highest priority buffer in the RX buffer queue 108 to the host interface buffer group 110.

Figure 3B:
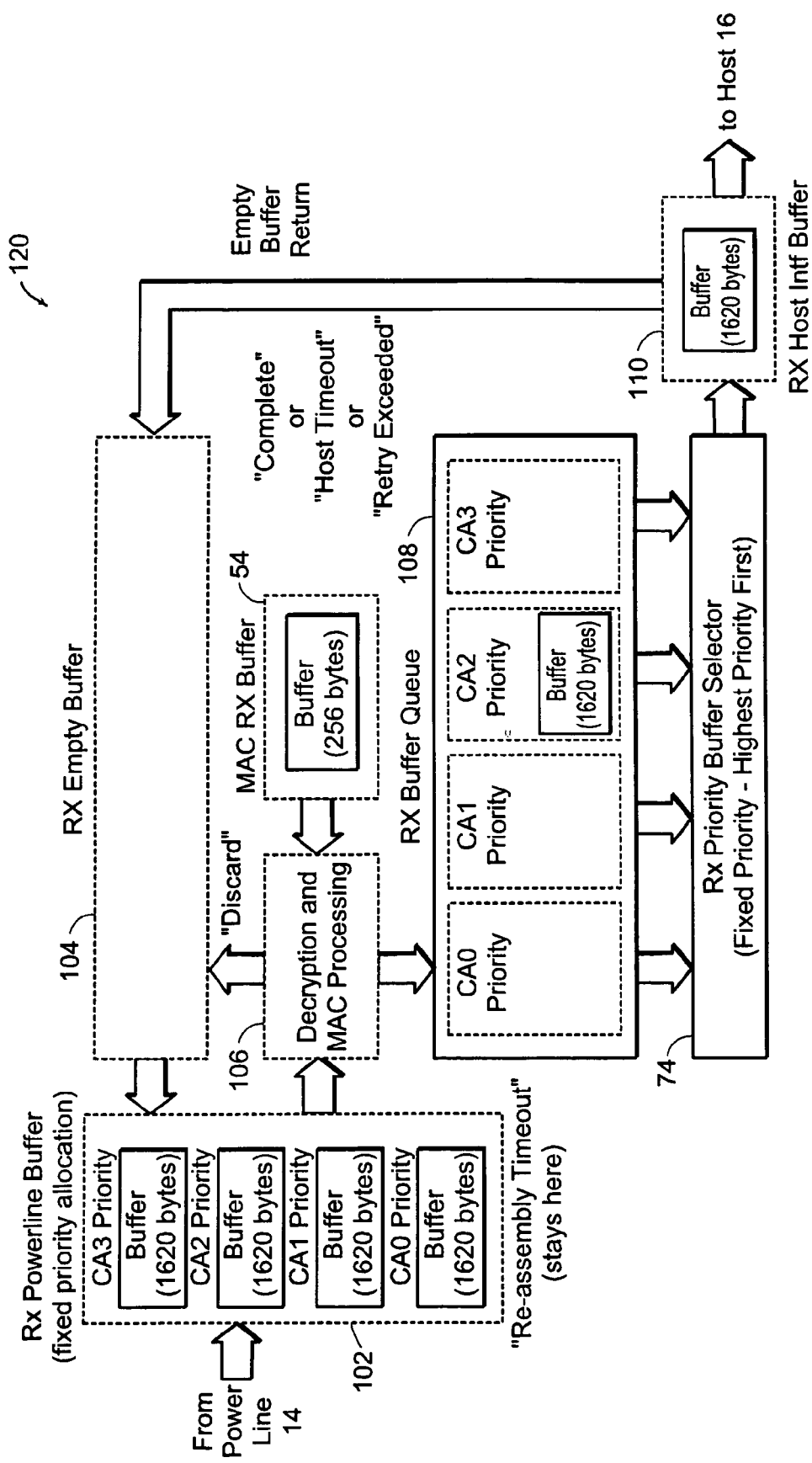

FIG. 3B illustrates a second receive buffer flow 120 in which there is one buffer in the buffer queue group, one buffer being used by RX host interface and four buffers available for power line reception. If the RX Host Interface 82a is slow in unloading the buffer in the RX host interface buffer group 110, the receive buffer chain backs up, causing the buffer queue group 108 to continue to increase its buffer count. This situation can occur if the RX Host Interface 82a has to flow control the receive buffer chain because it cannot get access to the host port due to host network traffic.

Figure 3C:
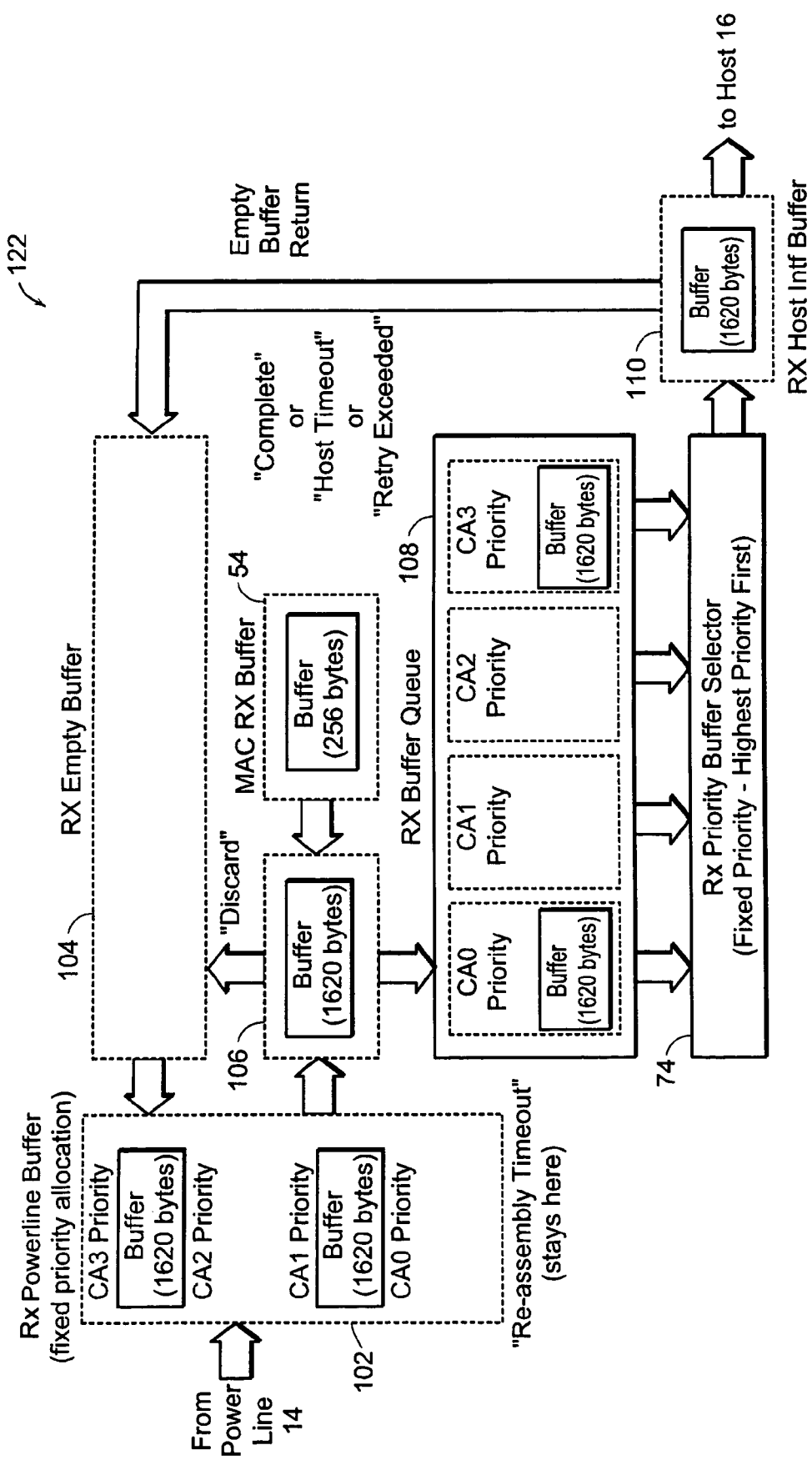

Referring to FIG. 3C, the progression of this effect is illustrated in a third exemplary receive buffer flow 122 in which there are two buffers in the buffer queue group 108 and one buffer in the decryption/MAC processing buffer group 106 being decrypted. At this stage, the power line buffer group 102 has only two buffers remaining. This specific case is unusual because the power line buffer group 102 has a CA3 buffer and a CA1 buffer, but does not have CA2 buffer. If the CA1 buffer is currently in use, it remains allocated at the CA1 priority until a CA2 priority MSDU needs to be received. At that point, the CA1 buffer would be dynamically re-allocated to the CA2 priority. If the CA1 priority buffer were not in use, it would be statically reallocated to the CA2 priority position. All CA0 power line MSDUs are sent FAIL responses because there is no buffer resource available at that priority. All CA3 CA2 (or CA1) priority communication can continue since buffer resources are available.

After a power line buffer is dispatched, a power line allocation algorithm is executed to shuffle the remaining buffers into the appropriate priority positions. The algorithm performs three separate tasks. First, the Link Sequencer 44 attempts to obtain a new empty buffer. If one is available, it is used to replace the buffer that was just dispatched. If an empty buffer is not available, then the static allocation is executed. The static allocation shifts an unused buffer (a buffer not currently being used for segment re-assembly) from a lower priority allocation to a higher priority allocation. If a buffer is in use, it remains at its current priority. Whenever the Link Sequencer 44 decodes a receive header that indicates a segment needs to be received, it executes a dynamic allocation algorithm. This algorithm first attempts to use the buffer at the receive segment's priority. If there is no buffer located at the receive segment's priority, a lower priority level buffer is reallocated to it. The algorithm attempts to select the lowest priority unused buffer first, followed by the lowest priority used buffer next. In this manner, segment re-assembly of a lower priority frame continues when a higher priority buffer is dispatched unless a higher priority segment needs to be received. When this happens, the lower priority buffer is re-allocated and the lower priority segment re-assembly process is cancelled.

Figure 3D:
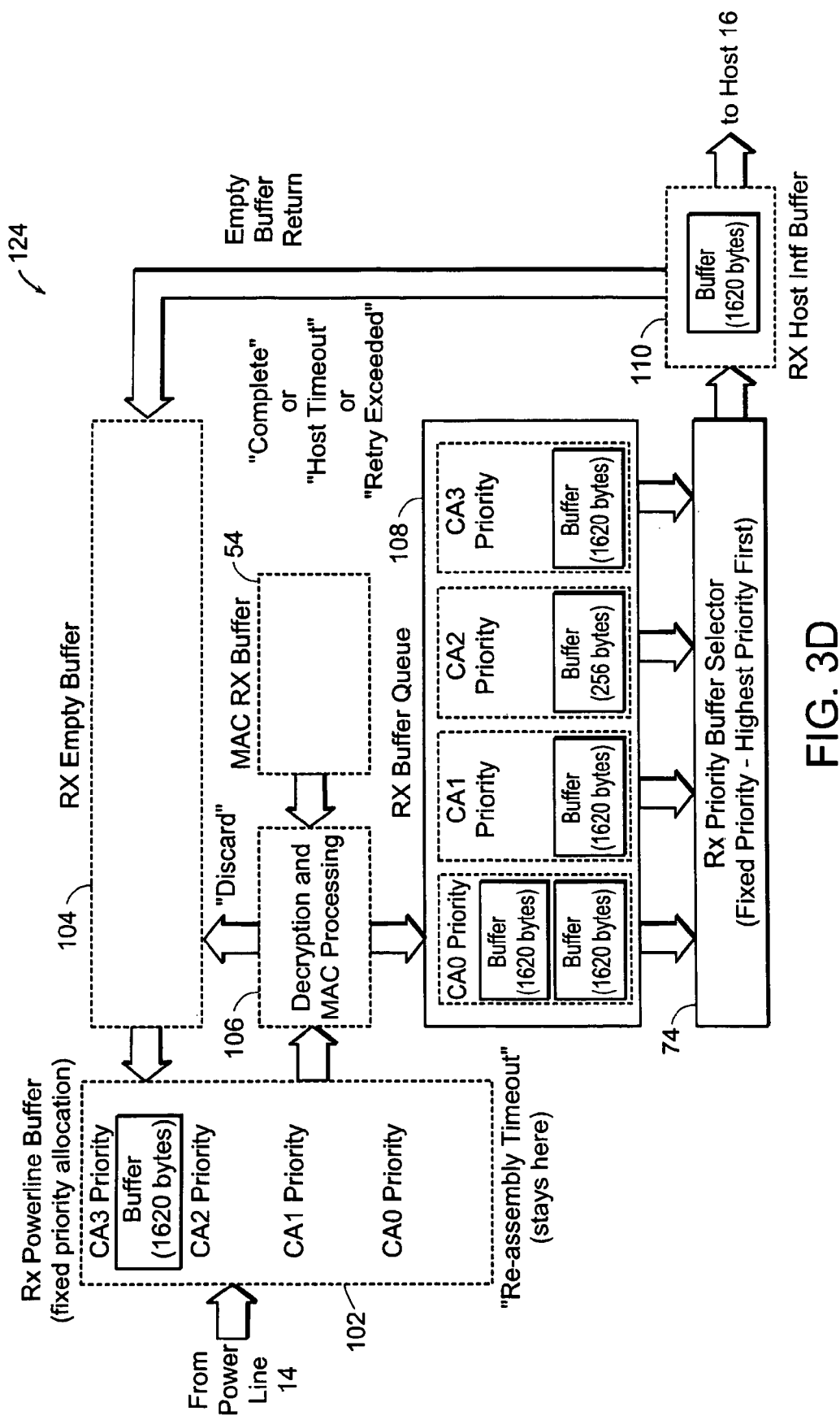

Referring to FIG. 3D, a fourth exemplary receive buffer flow 124 shows even further progression of the receive flow control backup in which there are five buffers in the buffer queue group 108. Note that the MAC RX buffer 54 is also being used. In this situation, all CA2, CA1 and CA0 priority power line MSDUs are sent FAIL responses because there are no buffer resources available for those levels. The CA3 priority communication can continue since a buffer resource is available for that level. If this continues, eventually, the buffer queue group 108 will contain six completed buffers and all powerline MSDUs will be sent FAIL responses, as there will be no buffer resources available.

When the host interface transfer completes (or, a host timeout occurs or retry threshold is exceeded), the buffer in the host interface group 110 is returned to the empty buffer group 114 and subsequently dispatched to the power line buffer group 102 for use in frame reception.

Figures 4, 4A:
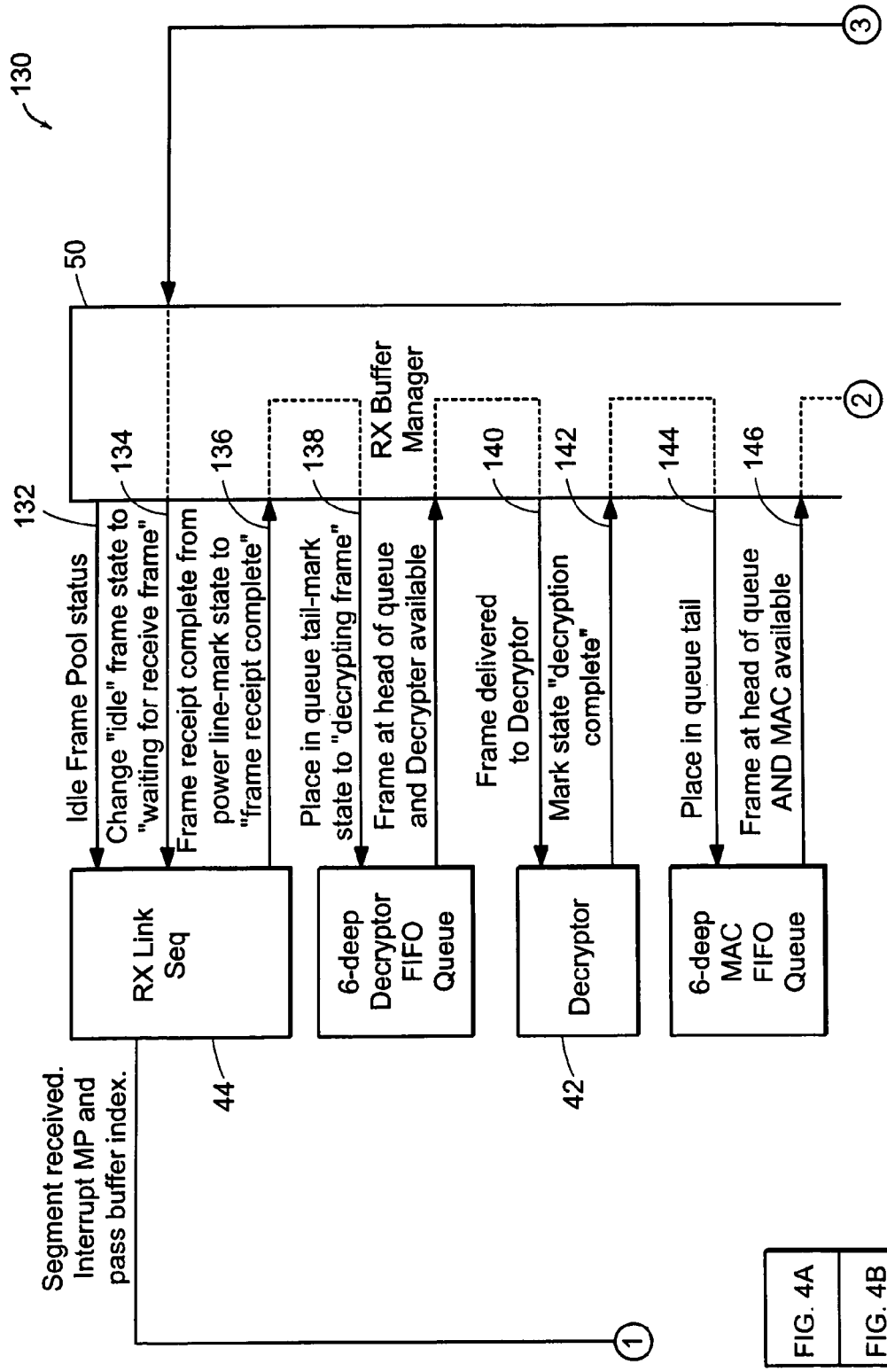
FIG. 4 is a block diagram illustrating the operation of an RX Buffer Manager for managing the RX buffers during a receive operation.

Referring now to FIG. 4, the management of the receive buffers by the RX Buffer Manager 50 during receive processing 130 is as follows. The RX Buffer Manager 50 provides idle buffer pool status to the Link Sequencer 44 to indicate that an empty buffer is available in the empty buffer group or pool 104 (task 132). If there are any empty buffers in the empty buffer pool 104 and the Link Sequencer 44 does not have four buffers, the RX Buffer Manager 50 changes the buffer's state to "waiting for receive frame" and delivers the empty buffer to the Link Sequencer 44 (task 134). Whenever a buffer's state is "waiting for receive frame," the buffer is owned by the Link Sequencer 44 and can be used for reception at any priority. Whenever a frame reception is complete, the Link Sequencer 44 changes the state of the buffer that was filled to "frame complete" and returns the buffer to the RX Buffer Manager 50 (task 136).

When the RX Buffer Manager 50 receives a buffer having "receive frame complete" state, the RX Buffer Manager 50 changes the buffer's state to "decrypting frame" and places it in a queue for the Decryptor 42 (task 138). When the Decryptor 42 is not in use, the frame buffer is delivered to the Decryptor 42 (task 140). The Decryptor 42 performs its decryption when a buffer's state is "decrypting state." When the decryption is complete, the Decryptor 42 changes the buffer state to "decryption complete" and returns the buffer to the RX Buffer Manager 50 (task 142). The RX Buffer Manager 50 places the buffer on the tail of a MAC Processor queue (task 144). When the RX Buffer Manager 50 receives indication that the MAC Processor 40 is not in use (task 146), the RX Buffer Manager 50 generates an interrupt to the MAC Processor 40 (task 148). The interrupt vector carries the index to the frame buffer and marks that status of the frame buffer as owned by the MAC Processor. The MAC Processor 40, when interrupted by the RX Buffer Manager 50, processes the frame identified by the index passed to it by the RX Buffer Manage 50. If an error (e.g., CRC error or decryption key error) occurs, the buffer's state is marked "idle" (indicating that reception is to be aborted) and the buffer is returned to the empty buffer pool (task 150). If no errors occurred during processing, the MAC Processor 40 marks the buffer's state as "available for Host RxDMA," indicating that reception is to proceed (task 152). The RX Buffer Manager 50 places the buffer in the tail position of one of the four RX queues in the buffer queue group 108 based on the frame/buffer priority (task 154). When the RX Buffer Manager 50 detects that a buffer is at the highest priority (compared to any other priority-based RX buffers in the buffer queue) and the RX host DMA is not busy (task 156), it enables the Host RX DMA engine 86 (FIG. 2) to deliver the buffer to the RX host interface 82a (task 158). If a buffer is owned by the RX host interface, the buffer can be used for retransmission. When the RX host interface has completed usage of the frame buffer, that is the transfer has completed, it returns the buffer to the RX Buffer Manager 50 (task 160). The RX Buffer Manager marks the buffer's state as "idle" and returns the buffer to the empty buffer pool (task 162).

Referring again to FIG. 2, the RX power line priority-based buffer allocation algorithm 49 of the Link Sequencer 44 includes both static and dynamic allocation. Static allocation is the re-allocation of an unused buffer from a lower priority position to a higher priority position after a buffer has been filled and dispatched to the RX Buffer Manager. Dynamic allocation is the re-allocation of a used or unused buffer from a lower priority position to a higher priority position when a segment needs to be received.

Referring to FIGS. 5A-5F, the algorithm 49 uses six routines or functions. An empty buffer reallocation (or "Get_A_Buffer") function 170 (FIG. 5A) defines the procedure for re-allocating a new empty buffer from the RX Buffer Manager. A static allocation function 172 (FIG. 5B) defines the procedure for re-allocating an existing unused buffer from a lower priority to a higher priority. A "receive_CA3_segment" function 174 (FIG. 5C) defines a procedure for re-allocating a low priority buffer to a CA3 priority buffer when a CA3 segment is received. A "receive_CA2_segment" function 176 (FIG. 5D) defines the procedure for re-allocating a low priority buffer to a CA2 priority buffer when a CA2 segment is received. A "receive_CA1_segment" function 178 (FIG. 5E) defines the procedure for re-allocating a low priority buffer to a CA1 priority buffer when a CA1 segment is received. A "receive_CA0_segment" function 180 (FIG. 5F) defines the procedure for using the CA0 priority buffer when a CA0 segment is received.

Figure 5A:
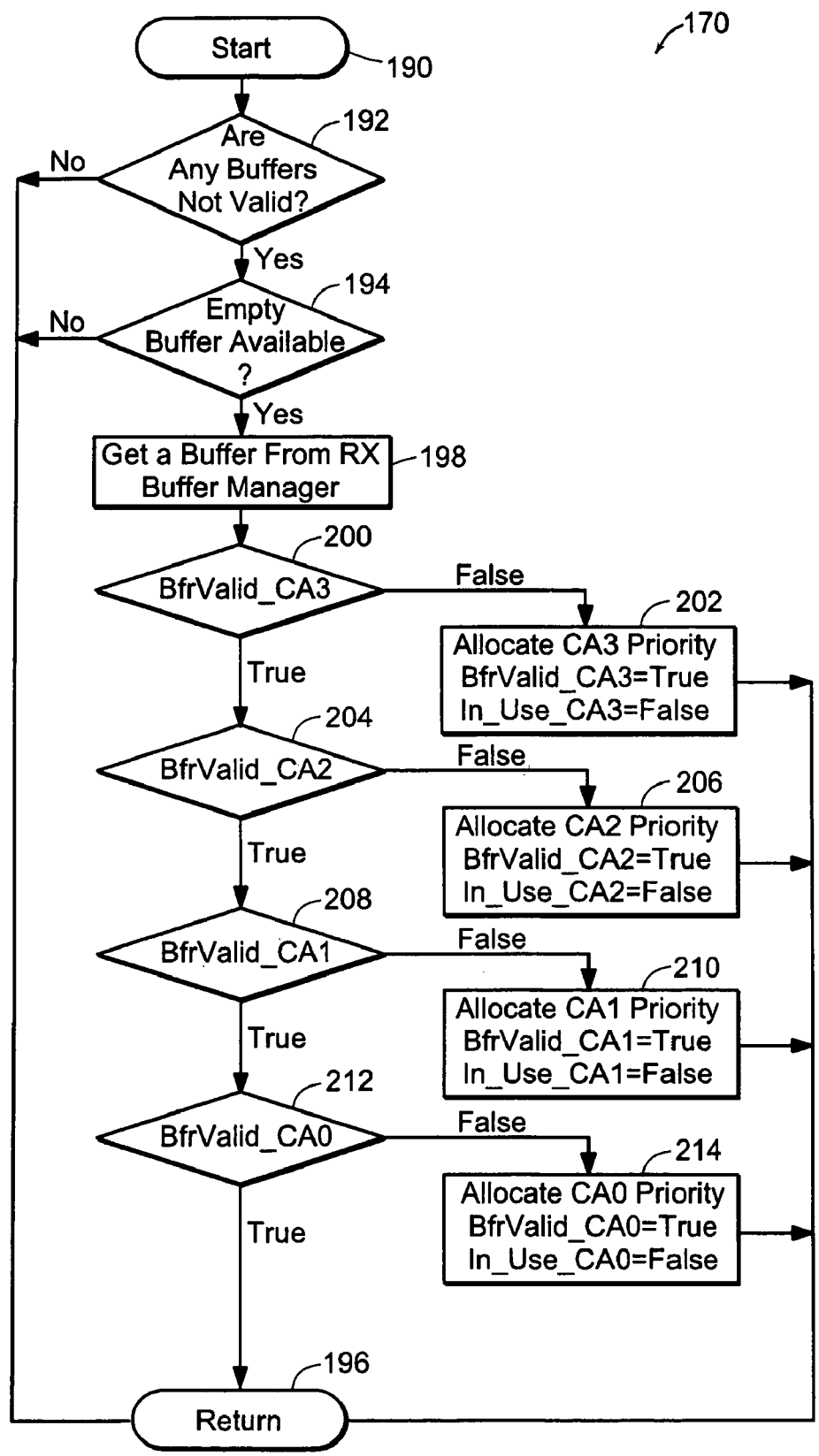
FIG. 5A is a flow diagram of an empty buffer allocation (Get_A_Buffer) routine.

Referring to FIG. 5A, if the Link Sequencer 44 does not have four valid buffers, it continually cycles through the "Get_A_Buffer" routine 170 attempting to get a new buffer. All of the routines use four Boolean variables (BfrValid_CA3, BfrValid_CA2, BfrValid_CA1 and BfrValid_CA0) to represent when a buffer is valid. A buffer is considered valid when it is owned by the Link Sequencer 44. There is one variable per buffer per priority. Similarly, there are four Boolean variables (In_Use_CA3, In_Use_CA2, In_Use_CA1, and In_Use_CA0) to indicate if a buffer is in use. A buffer is considered in use when it contains at least one receive segment.

The Get_A_Buffer routine 170 begins (step 190) by determining if any of the four buffers needed by the Link Sequencer is not valid (step 192) and determining if the RX Buffer Manager has an empty buffer (step 194). If either condition is not true, the routine 170 simply returns (step 196) without performing any task. If both conditions are true, the routine 170 obtains an empty buffer from the RX Buffer Manager (step 198) and proceeds to allocate the buffer in priority order (CA3 first, CA2 second, CA1 third, CA0 last).

The routine first determines if there is a valid buffer for the CA3 priority (step 200). If BfrValid is equal to 'false', the new buffer is allocated to the CA3 priority, the BfrValid_CA3 and In_Use_CA3 variables are set to 'true' and 'false' values, respectively (step 202). If the CA3 priority has a valid buffer (that is, BfrValid_CA3=true) already, the routine checks the validity of CA2 buffer (step 204). If BfrValid CA2=false, the new buffer is allocated to the CA2 priority, the BfrValid_CA2 and In_Use_CA2 variables are set to 'true' and 'false' values, respectively (step 206). If, at step 204, the condition of BfrValid_CA2 is determined to be 'true,' the routine determines the validity of the CA1 priority (step 208). If the CA1 buffer is not valid (BfrValid_CA1=false), the routine allocates the new buffer to the CA1 priority and makes the appropriate adjustments to the BfrValid and In_use variables for CA1 (step 210). If it is determined that BfrValid_CA1 is equal to 'true' for CA1, then the routine checks if a valid buffer exists for the CA0 priority (step 212). If the CA0 buffer is not valid, the routine allocates the new buffer to the CA0 priority, setting BfrValid_CA0 to 'true' and In_Use_CA0 to 'false' (step 214). If, at step 212, it is determined that a buffer is valid for CA0, then there are valid buffers for all four priority levels and the routine returns (step 196).

Figure 5B:
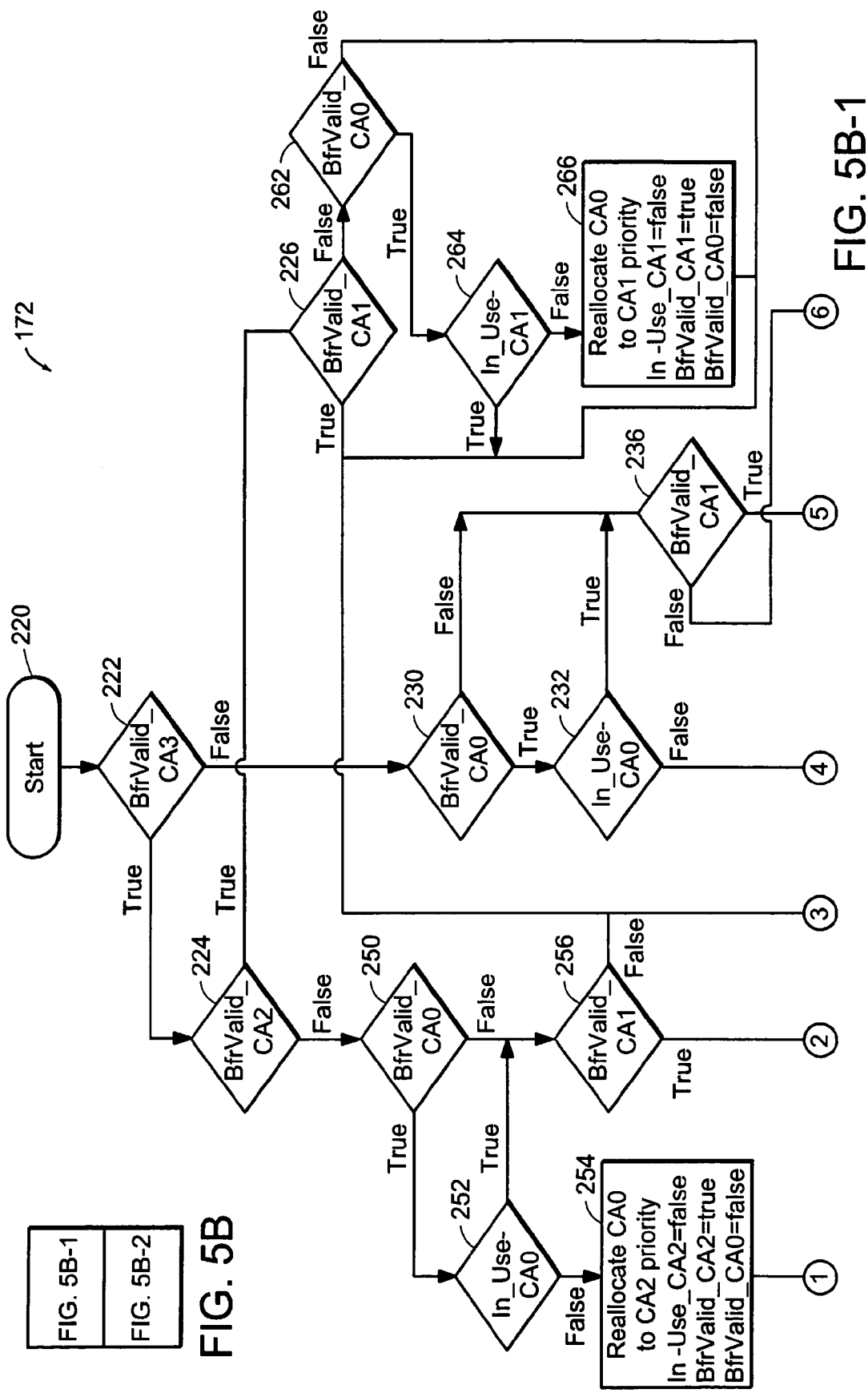
FIG. 5B is a flow diagram of a static reallocation routine.
Figures 2, 5B:
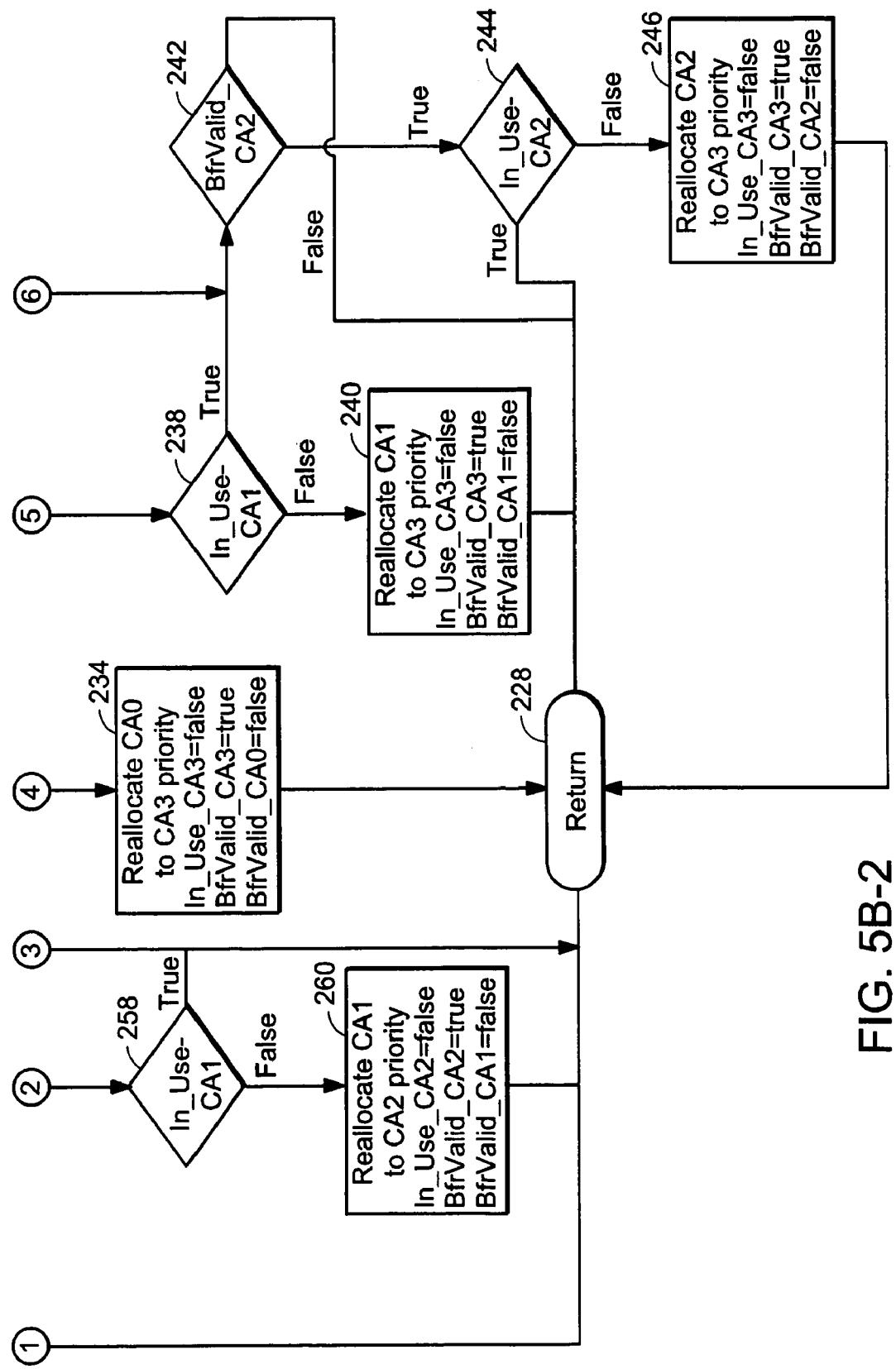

Referring now to FIG. 5B, the static allocation routine 172 begins (step 220) by determining if valid CA3, CA2 and CA1 priority buffers exist (steps 222, 224 and 226, respectively). If they do, the routine 172 performs no task and returns (step 228).

If, at step 222, it is determined that BfrValid_CA3 is equal to 'false', that is, a buffer does not exist for the CA3 priority, the routine checks the lowest priority CA0 to determine if CA0 has a valid buffer (step 230) that is not being used (step 232). If a valid CA0 priority buffer is not in use, the routine allocates the buffer to the CA3 priority. In doing so, it sets the variables In_Use_CA3, BfrValid_CA3 and BfrValid_CA0 to 'false,' 'true' and 'false,' respectively (step 234). If the buffer for CA0 is not valid or is in use, the routine performs the same steps for CA1 priority (steps 236, 238, 240) and then CA2 priority (steps 242, 244, 246) if CA1 cannot provide an unused buffer. If an unused buffer does not exist at the CA2 priority level, the routine returns at step 228.

If, at steps 222 and 224, it is determined that a valid CA3 priority buffer exists (BfrValid_CA3=true) but a CA2 priority buffer does not (BfrValid_CA2=false), the routine 172 determines if there is a lower priority buffer that can be re-allocated to fill the CA2 priority position. First, the routine determines if there is a CA0 priority buffer that is valid (step 250) and not in use (step 252). If so, the routine re-allocates that buffer to the CA2 priority position (step 254). The routine sets the values of the In_Use_CA2, BfrValid_CA2, and BfrValid_CA0 variables to 'false', 'true' and 'false,' respectively. If the CA0 priority buffer is invalid or being used, the routine proceeds to check the status of the CA1 priority buffer. If the routine determines that the CA1 priority buffer is valid (step 256) and that the CA1 priority buffer is not being used (step 258), the routine re-allocates the CA1 priority buffer to the CA2 priority position, sets the InUse_CA2 to 'false', BfrValid_CA2 to 'true and BfrValid_CA1 to 'false' (step 260). If both buffers are being used, no buffers are reallocated and the routine returns (step 228).

If, at steps 222, 224, 226, a valid buffer exists for CA3 and CA2 but not for CA1, the routine determines if a valid lower level priority, that is, CA0, buffer exists (step 262) and is not in use (step 264). If a valid CA0 priority buffer does not exist or is in use, the routine returns at step 228 and no reallocation is performed. If the CA0 buffer is valid and not in use, the routine reallocates the CA0 priority buffer to CA1, sets In_Use_CA1 to 'false,' sets BfrValid_CA1 to 'true' and sets BfrValid_CA0 to 'false' (step 266). Thus, the routine 172 attempts to move one buffer from a lowest unused priority position to a highest empty position.

Figures 2, 5C:
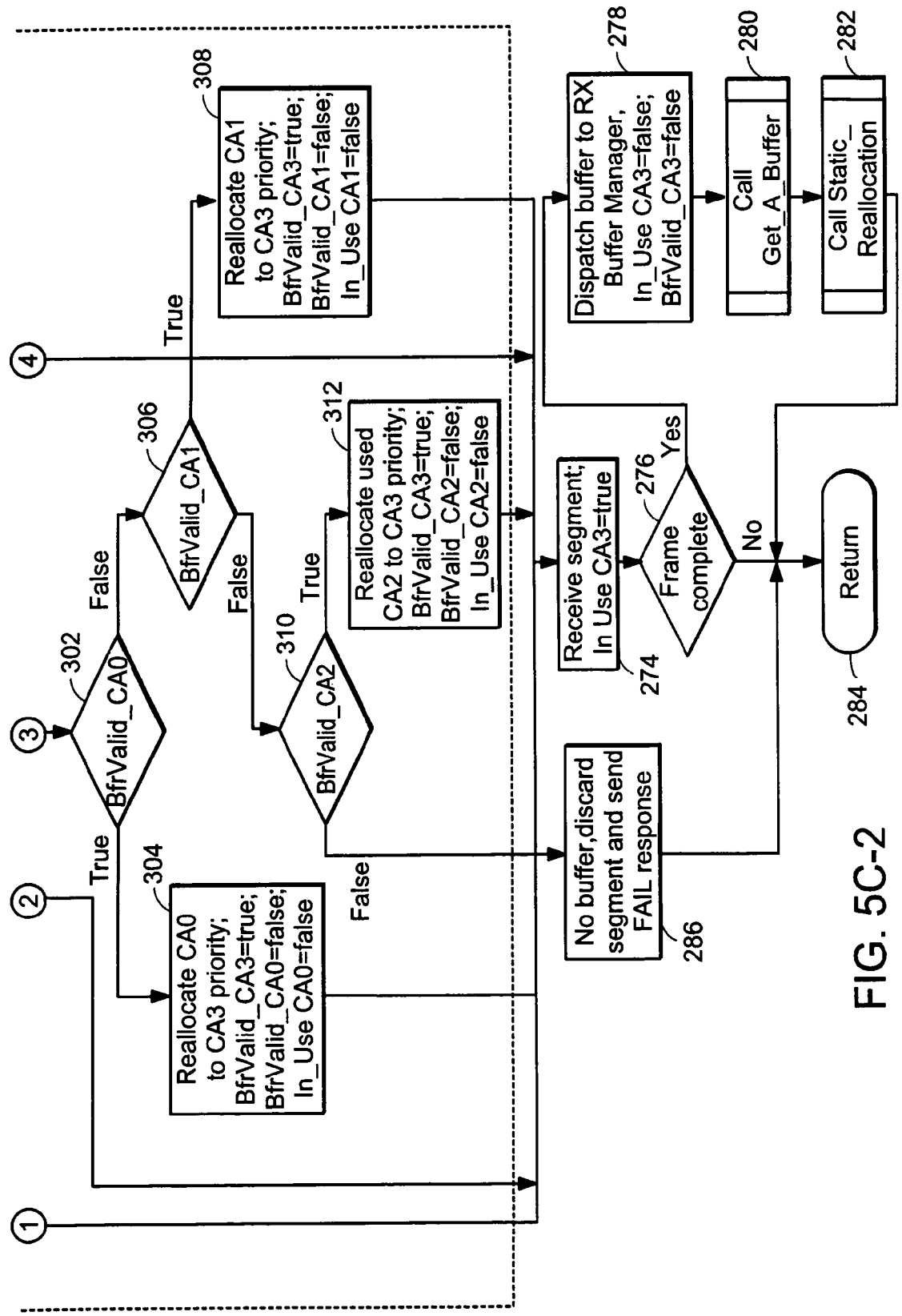
FIGS. 5C-5F are flow diagrams of routines for allocating buffers at the different priorities using a dynamic allocation routine in conjunction with the static reallocation and empty buffer allocation routines (of FIGS. 5A and 5B, respectively).

Referring to FIG. 5C, the receive_CA3_segment routine 174 is executed after a segment header has been decoded and it is decided that a CA3 segment is to be received. The routine 174 begins (step 270) by attempting to dynamically reallocate an unused, lower priority buffer and, failing that, a used lower priority buffer (step 272). The process of taking a used or unused buffer at the time a segment needs to be received is termed dynamic allocation as it occurs dynamically as the receive occurs. If the dynamic reallocation is successful, the routine performs as follows. It receives the segment into the CA3 buffer and sets In_Use_CA3 equal to 'true'(step 274). If the routine determines that the frame is complete (step 276), the routine dispatches the buffer to the Rx Buffer Manager, which marks the buffer as "not in use" and invalid by resetting In_Use_CA3 and BfrValid_CA3 to 'false', respectively (step 278). The routine invokes the Get_A_Buffer routine 170 (to try to get a new buffer) (step 280) and the Static_Reallocation routine 172 (step 282) to try to reallocate lower priority buffers in case an empty buffer could not be obtained, and returns at step 284. If the dynamic reallocation is unsuccessful (no buffer is available to receive the segment), the segment is discarded and a FAIL response it sent to the transmitter (step 286). The order of steps 280 and 282 is not critical. They can be executed in either order with no significant change to the algorithm results.

The dynamic allocation step or procedure for CA3 272 is as follows. The routine determines if a valid buffer exists for CA3 (step 288). If yes, the routine continues to steps 274 through 284. Otherwise, the routine tries to re-allocate buffers in the following order: unused CA0 priority first (steps 290, 292), unused CA1 priority second (steps 294, 296), unused CA2 priority third (steps 298, 300), used CA0 priority fourth (step 302 and 304), used CA1 priority fifth (steps 306, 308) and used CA2 priority last (step 310 and step 312). Specifically, with respect to the unused buffer CA0, the routine determines if the result of the logical AND'ing of BfrValid_CA0 and the complement of In_Use_CA0 is true or false (step 290). If true, the routine reallocates the unused CA0 buffer to the higher CA3 priority, sets BfrValid_CA3 to 'true' and BfrValid_CA0 to 'false' (step 292) and proceeds to step 274. If false, the routine proceeds to perform the same operations for CA1 (steps 294, 296). If a false result is determined at step 294, the routine proceeds to CA2. Thus, the routine determines if the result of the logical AND'ing of BfrValid_CA2 and the complement of In_Use_CA2 is true or false (step 298). If true, the routine reallocates the unused CA2 buffer to the higher CA3 priority, sets BfrValid_CA3 to 'true' and BfrValid_CA2 to 'false' (step 300) and proceeds to step 274. If false, the routine evaluates the used buffers, beginning with the lowest priority, CA0. Thus, turning to step 302, the routine determines if BfrValid_CA0 is true or false. If true, the routine reallocates the used CA0 buffer to the CA3 priority, sets BfrValid_CA3 to 'true' and BfrValid_CA0 to 'false', and sets In_Use_CA0 to 'false'. If false, the routine proceeds to CA1 and performs the same type of steps (steps 306, 308) for CA1. If the result of step 306 is false, the routine examines BfrValid_CA2 to determine if the condition is true (step 310). If so, the routine reallocates the used CA2 buffer to the CA3 priority, sets BfrValid_CA3 to 'true' and BfrValid_CA2 to 'false', and sets In_Use_CA2 to 'false'. Otherwise, the routine proceeds to step 286.

Figure 5D:
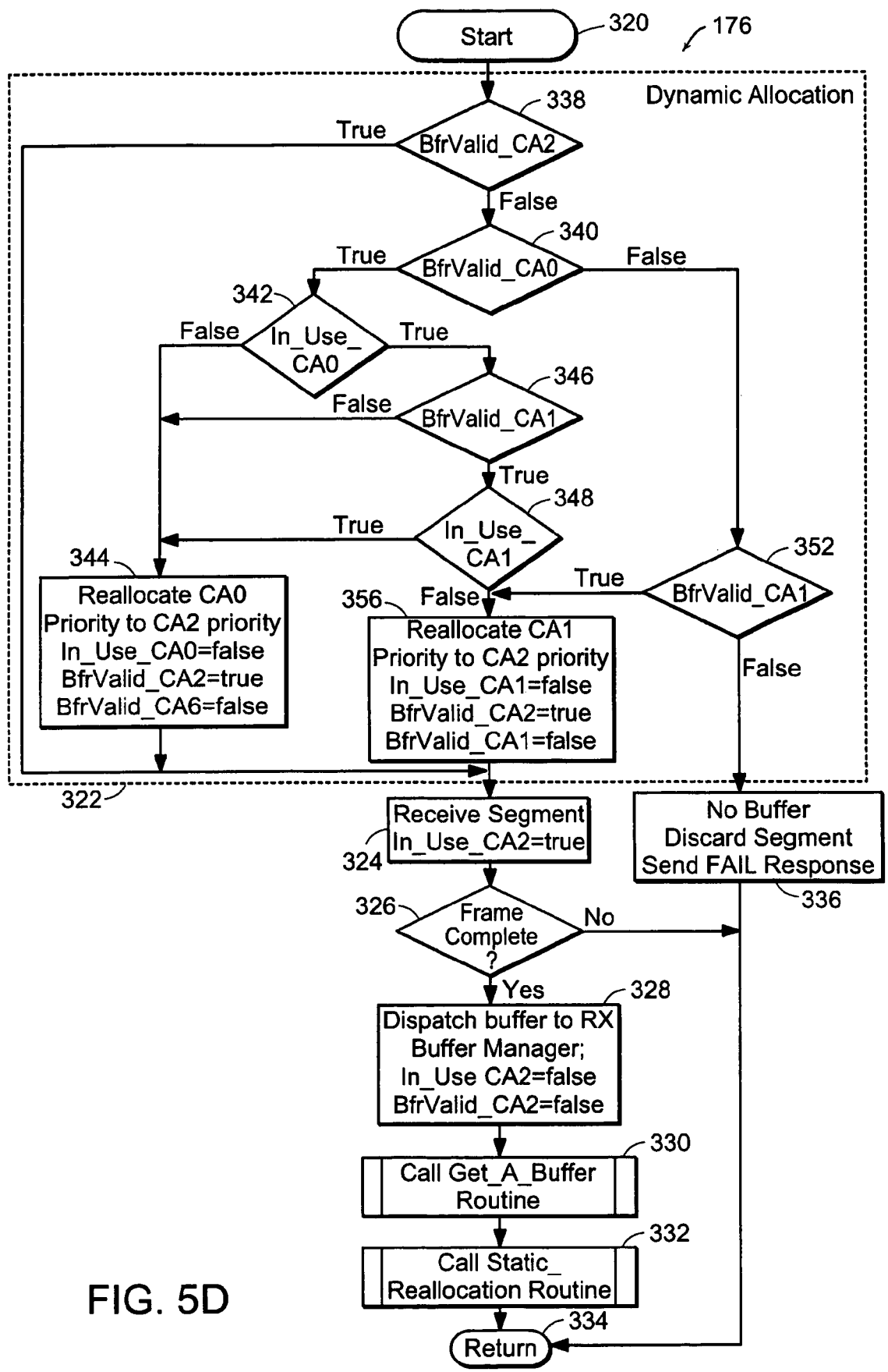

Referring to FIG. 5D the receive CA2 segment routine 176 is executed after a segment header has been decoded and it is decided that a CA2 segment needs to be received. The routine 176 begins (step 320) by attempting to dynamically reallocate an unused, lower priority buffer and, failing that, a used lower priority buffer (step 322). If the dynamic reallocation is successful, the routine performs as follows. It receives the segment into the CA2 buffer and sets In_Use_CA2 equal to 'true' (step 324). If the routine determines that the frame is complete (step 326), the routine dispatches the buffer to the Rx Buffer Manager, which marks the buffer as "not in use" and invalid by resetting In_Use_CA2 and BfrValid_CA2 to 'false', respectively (step 328). The routine invokes the Get_A_Buffer routine 170 (to try to get a new buffer) (step 330) and the Static_Reallocation routine 172 (step 332) to try to reallocate lower priority buffers in case an empty buffer could not be obtained, and returns at step 334. If the dynamic reallocation is unsuccessful (no buffer is available to receive the segment), the segment is discarded and a FAIL response it sent to the transmitter (step 336). Note that the order of steps 330 and 332 are not critical. They can be executed in either order with no significant change to the algorithm results.

The dynamic allocation step or procedure for CA2 322 is as follows. The routine determines if a valid buffer exists for CA2 (step 338). If yes, the routine uses the buffer and thus continues to steps 324 through 334. Otherwise, the routine tries to re-allocate buffers in the following order: unused CA0 priority first (steps 340, 342, 344), unused CA1 priority second (steps 346, 348, 350), used CA0 priority third (steps 348, 344 or 346, 344), used CA1 priority fourth (step 352 and step 350).

Figure 5E:
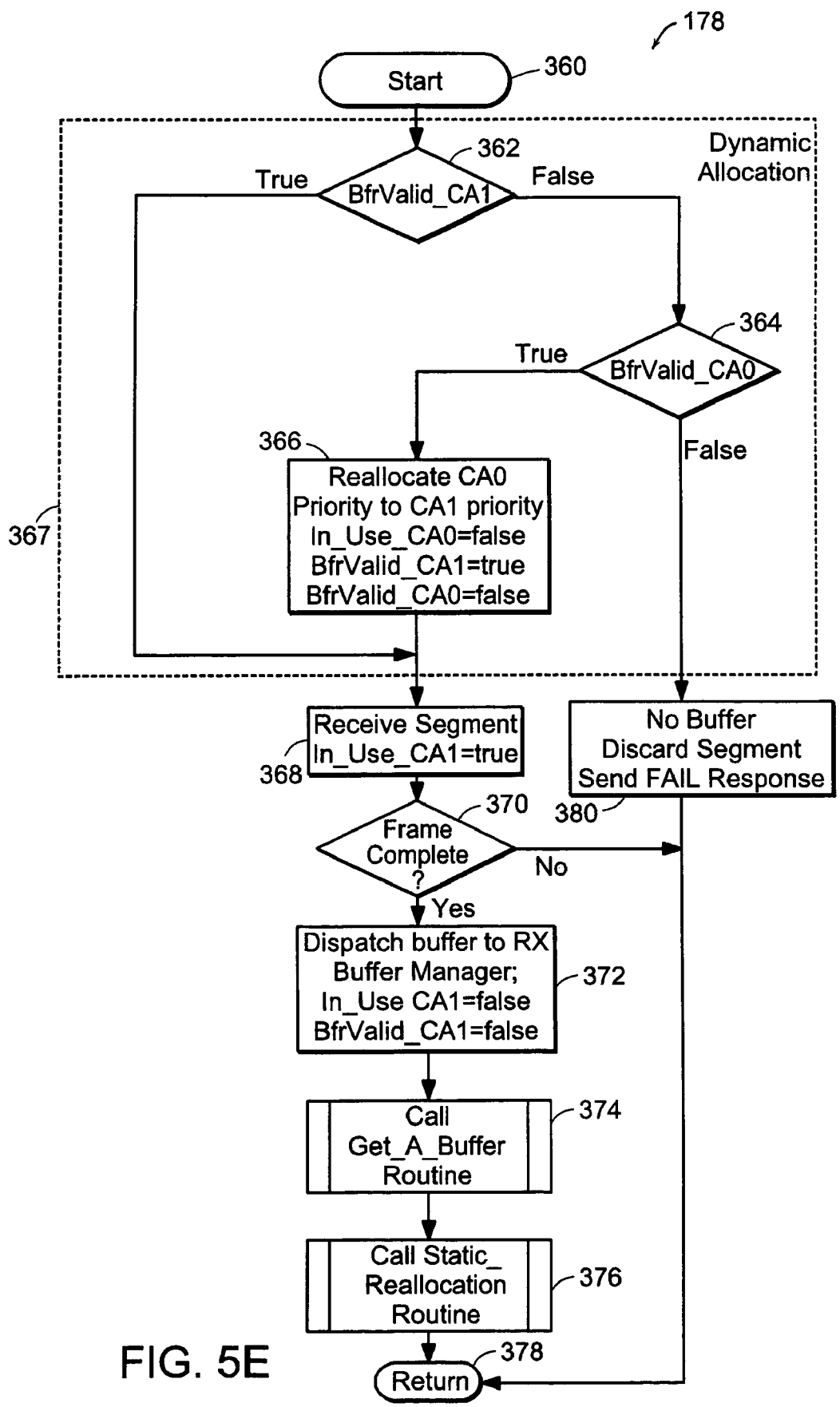
Figure 5F:
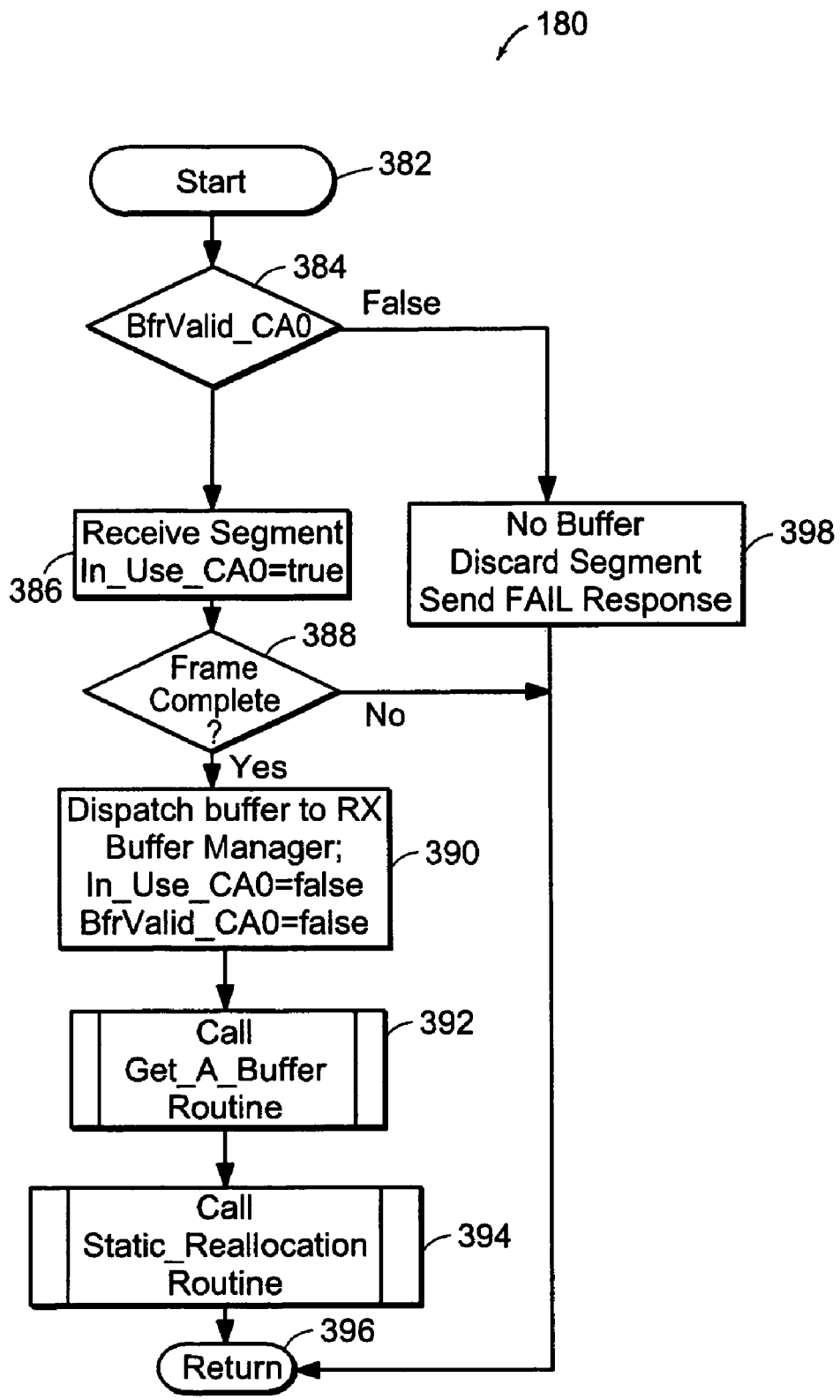

Referring to FIG. 5E, the receive CA1 segment routine 178 is executed after a segment header has been decoded and it is decided that a CA1 segment needs to be received. The routine begins (step 360) by determining if a valid CA1 priority buffer does not exist (step 362) and a valid CA0 priority buffer does exist (step 364). If so, the routine reallocates the CA0 buffer to CA1 (step 366). Thus, collectively, steps 362, 364 and 366 represent a dynamic allocation process 367. If, at step 362, a valid CA1 buffer is determined to exist, or CA0 has been reallocated to CA1, the segment is received in the CA1 buffer (step 368). The routine checks to see if the frame is complete (step 370). If the frame is complete, the routine dispatches the filled buffer to the RX Buffer Manager and marks the buffer invalid and not in use (step 372). The routine calls the Get_A_Buffer routine 170 (step 374) to try to get a new buffer, then calls the static allocation routine 172 (step 376) to try to re-allocate lower priority buffers in case an empty buffer was not obtained and returns (step 378). If, at step 370, it is determined that the frame in not complete, the routine returns at step 378. If there are no buffers available, the segment is discarded and a FAIL response it sent (step 380). Note that the order of steps 374 and 376 are not critical. They can be executed in either order with no significant change to the algorithm results Referring to FIG. 5F, the receive CA0 segment routine 180 is executed after a segment header has been decoded and it is decided that a CA0 segment needs to be received. The routine 180 begins at step 382. The routine 180 determines if a valid CA0 priority buffer exists (step 384). If it is determined that a valid CA0 priority buffer exists, the segment is received in the CA0 buffer (step 386). The routine checks to see if the frame is complete (step 388). If the frame is complete, the routine dispatches the filled buffer to the RX Buffer Manager and marks the buffer invalid and not in use (step 390). The routine then calls the Get_A_Buffer routine to try to get a new buffer (step 392) and calls the static allocation routine to try to re-allocate lower priority buffers in case an empty buffer was not obtained (step 394). If, at step 388, it is determined that the frame in not complete, the routine returns (step 396). If there are no buffers available, that is, the CA0 buffer in invalid, the segment is discarded and a FAIL response sent (step 398) and the routine returns at step 396. Note that the order of steps 392 and 394 are not critical. They can be executed in either order with no significant change to the algorithm results. Also, step 394 may not need to be done.

Like the RX buffering mechanism as thus described, the TX buffering mechanism of the MAC unit 18 is also optimized to support priority-based network traffic.

Figure 4B:
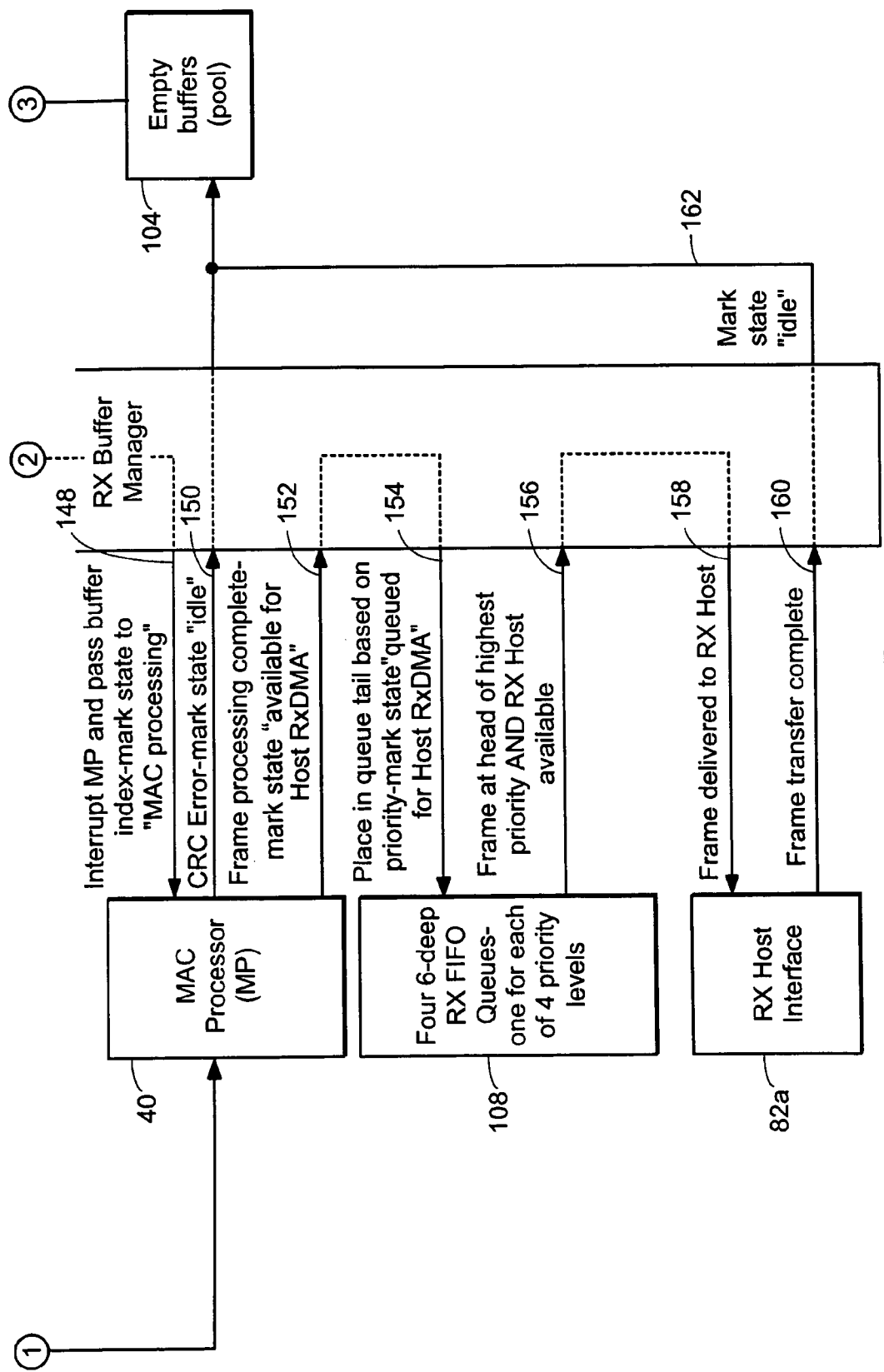
Figure 6A:
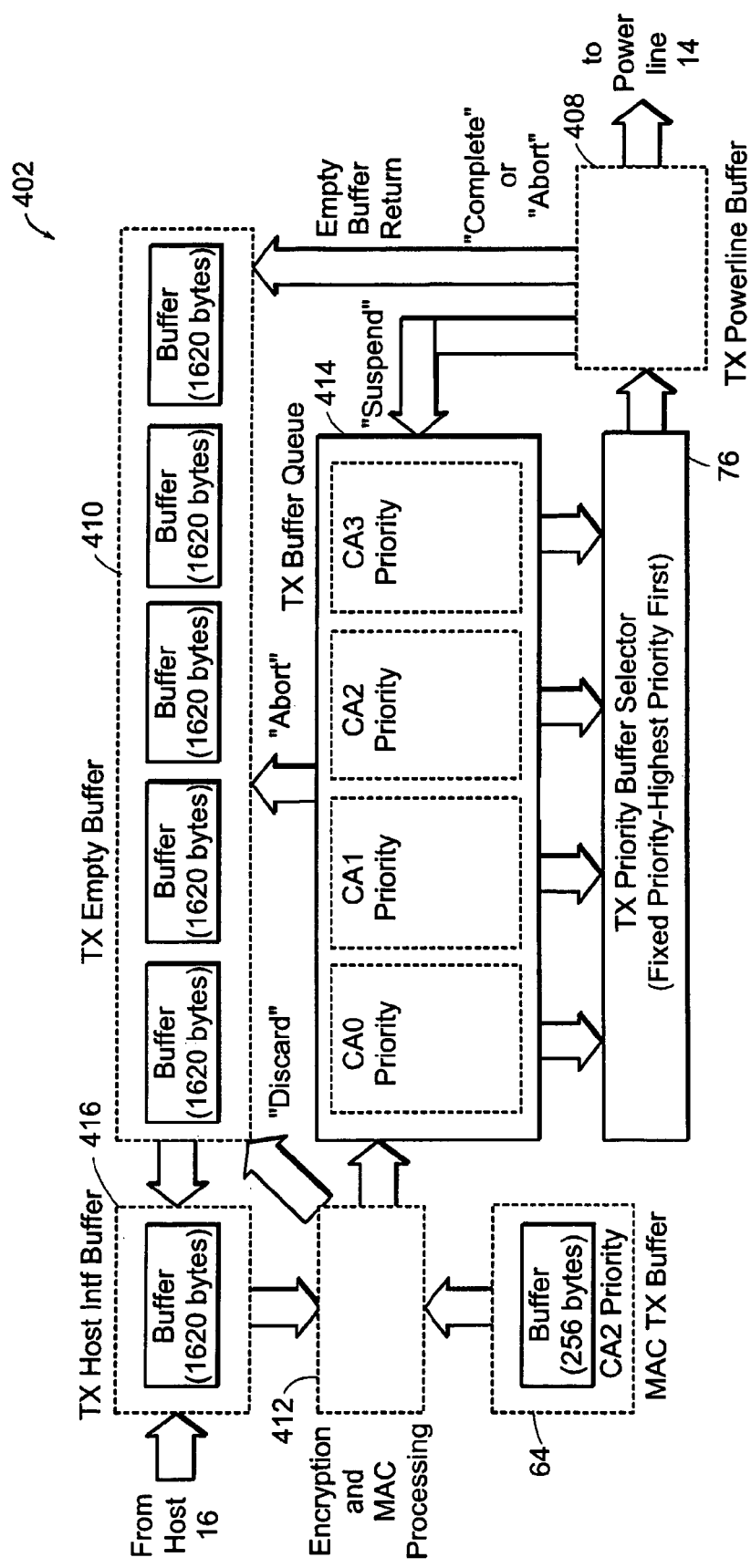
FIGS. 6A-6C are block diagrams depicting transmit (TX) buffer flow for TX buffers in a multi-priority buffer scheme within the MAC unit of FIG. 2.
Figure 6B:
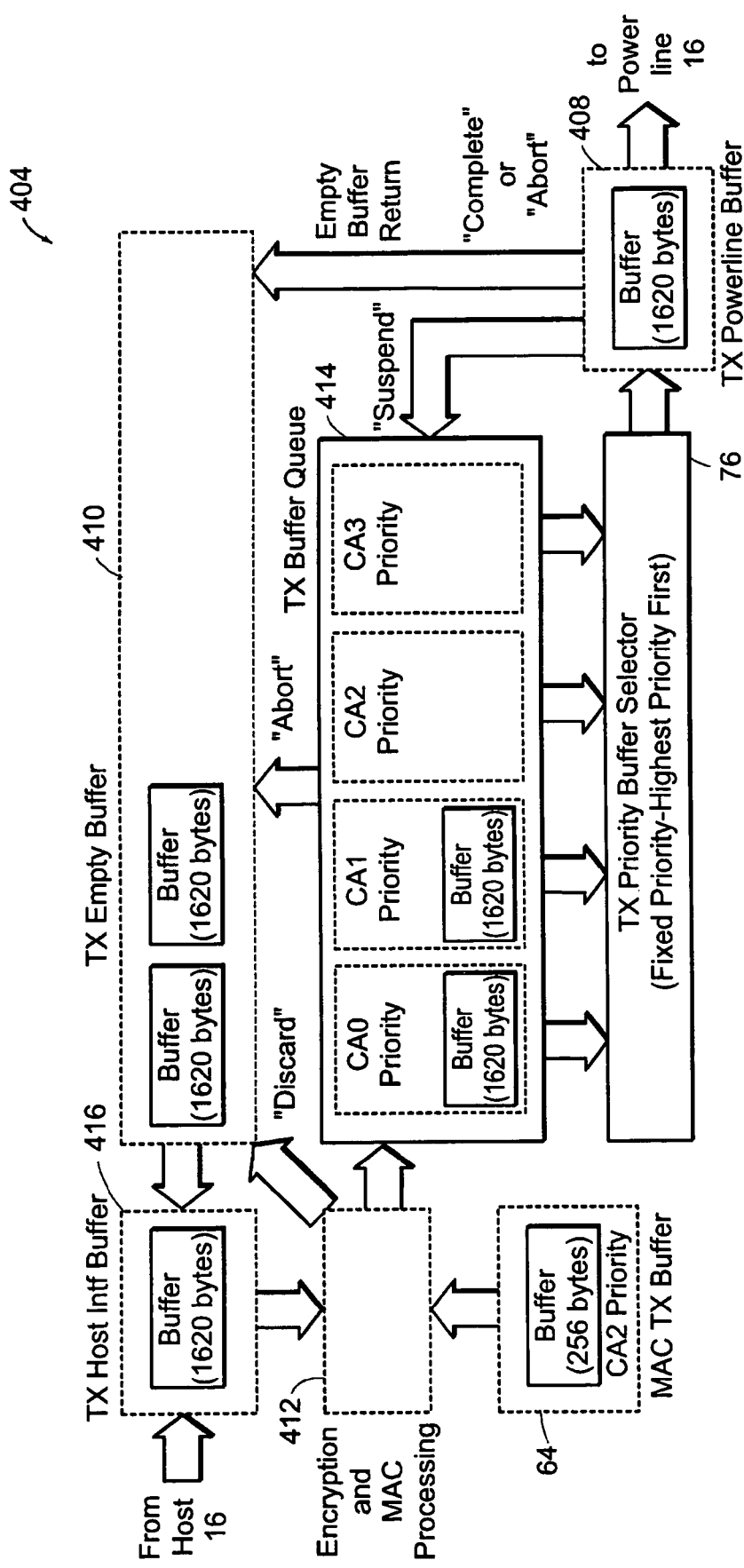
Figure 6C:
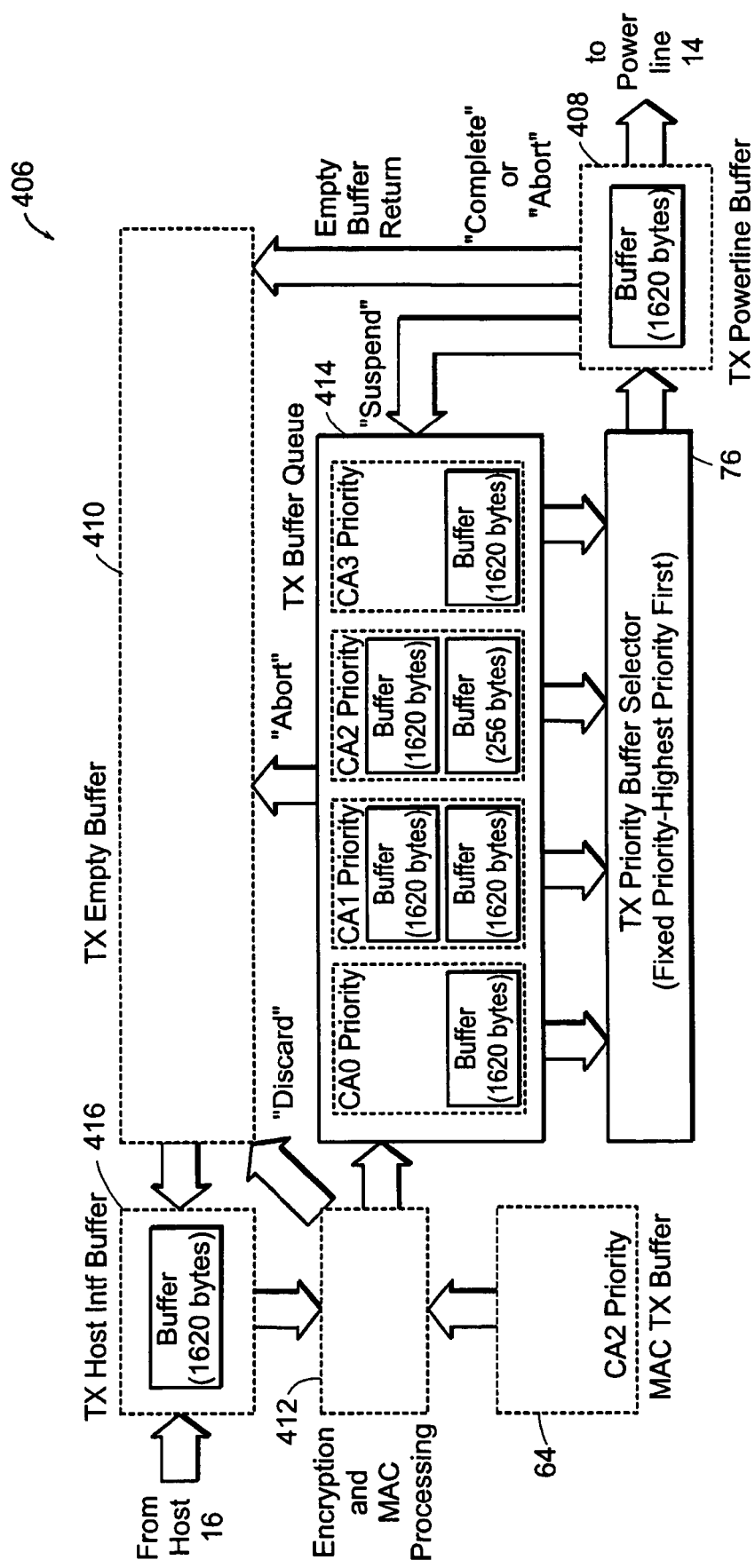

As shown in exemplary TX buffer flows 402, 404, 406 of FIGS. 6A-6C, respectively, the transmit buffers of the TX buffer memory 48 are organized into five groups: 1) a TX power line buffer group 408; 2) TX empty buffer group 410; 3) Encryption/MAC processing group 412; 4) TX buffer queue group 414; and 5) a TX host interface buffer group 416. The power line buffer group 408 includes zero to one buffer (corresponding to one of the TX Out Buffers 66, FIG. 2) to be used by the Link Sequencer for transferring MSDUs to the power line 14. The empty buffer group 410 includes zero to six empty buffers waiting to be dispatched to the host interface buffer group 416. The empty buffer group 410 attempts to keep the host group full. The encryption buffer group 412 includes zero to one buffer (corresponding to TX Process Buffer 70, FIG. 2) containing an Ethernet frame that needs to be further processed into a transmit MSDU and then encrypted. The queue buffer group 414 includes zero to six buffers (corresponding to the TX Out Buffers 66, FIG. 2) containing completed transmit MSDUs. The host interface buffer group 416 includes zero to one buffer (corresponding to the TX Host Interface Buffer 72, FIG. 2) being used by the host interface. FIGS. 4A-4C illustrate buffer usage at various points of transmit operation.

Referring to the TX buffer flow example 402 of FIG. 6A, after power initialization, the empty buffer group includes six empty buffers and all other groups contain zero buffers. An empty buffer is dispatched to the host group. When the host buffer is filled with a completed transmit frame, it is dispatched to the encryption group. The empty buffer group attempts to dispatch a new empty buffer to the host group to replace the one it released. After MAC processing and encryption is completed, the transmit buffer is dispatched to the buffer queue group. If MAC processing determines the buffer needs to be discarded, the buffer returns to the empty buffer group. Buffers in the buffer queue group are made available to the TX priority buffer selector 76. The TX priority buffer selector 76 dispatches completed buffers (those containing completed power line MSDUs) to the power line buffer group one at a time on a fixed priority basis. The priority allocation is organized based on the following channel access priorities: CA3 first, CA2 second, CA1 third and CA0 last.

The buffer flow 404 of FIG. 6B shows the transmit buffer flow at a point in which the power line buffer group 408 has the one buffer it is currently transmitting and the buffer queue group 414 contains two pending buffers. As buffers are filled by the host interface and dispatched to the buffer queue group 414, the buffer queue group increases it buffer count while the empty group decreases its buffer count. The TX priority buffer selector 76 routes the highest priority buffer to the power line buffer group 408. If a buffer waits in the buffer queue group 414 past its allowable lifetime, it is aborted and returned to the empty buffer group 410. If the buffer queue group 414 contains an MSDU with a priority higher than the one currently occupied by the power line buffer group 408, it informs the power line buffer group 408 that a higher priority buffer is pending. If transmission is not currently underway, the lower priority buffer is suspended and returned to the head of the buffer queue group 414 (at its priority level). The pending higher priority MSDU is dispatched from the buffer queue group 414 to the power line buffer group 408. After the higher priority MSDU is transmitted, the empty buffer is returned to the empty buffer group 410. If there are no more pending higher priority buffers, then the suspended buffer is dispatched from the buffer queue group to the power line buffer group 408 to resume transmission.

If the power line buffer group is slow in unloading the TX power line buffer, the transmit buffer chain backs up. This back up condition causes the buffer queue group 414 to continue to increase in buffer count. This type of situation can occur if the power line buffer group 408 has to flow control the transmit buffer chain because the Link Sequencer cannot get access to the powerline network.

The TX buffer flow example 406 of FIG. 6C illustrates the final progression of this effect in which there are six buffers in the buffer queue group 414. Note that the MAC TX buffer 64 is also being used. At this point, the host interface buffer group 416 has no buffer. Therefore, the host interface must flow control its network in order to prevent transmit frame overruns. In order to initiate flow control early enough, the host interface may need to apply flow control before it determines there are no empty buffers. The empty buffer group 410 provides empty buffer status to the host group for this purpose.

Figure 7B:
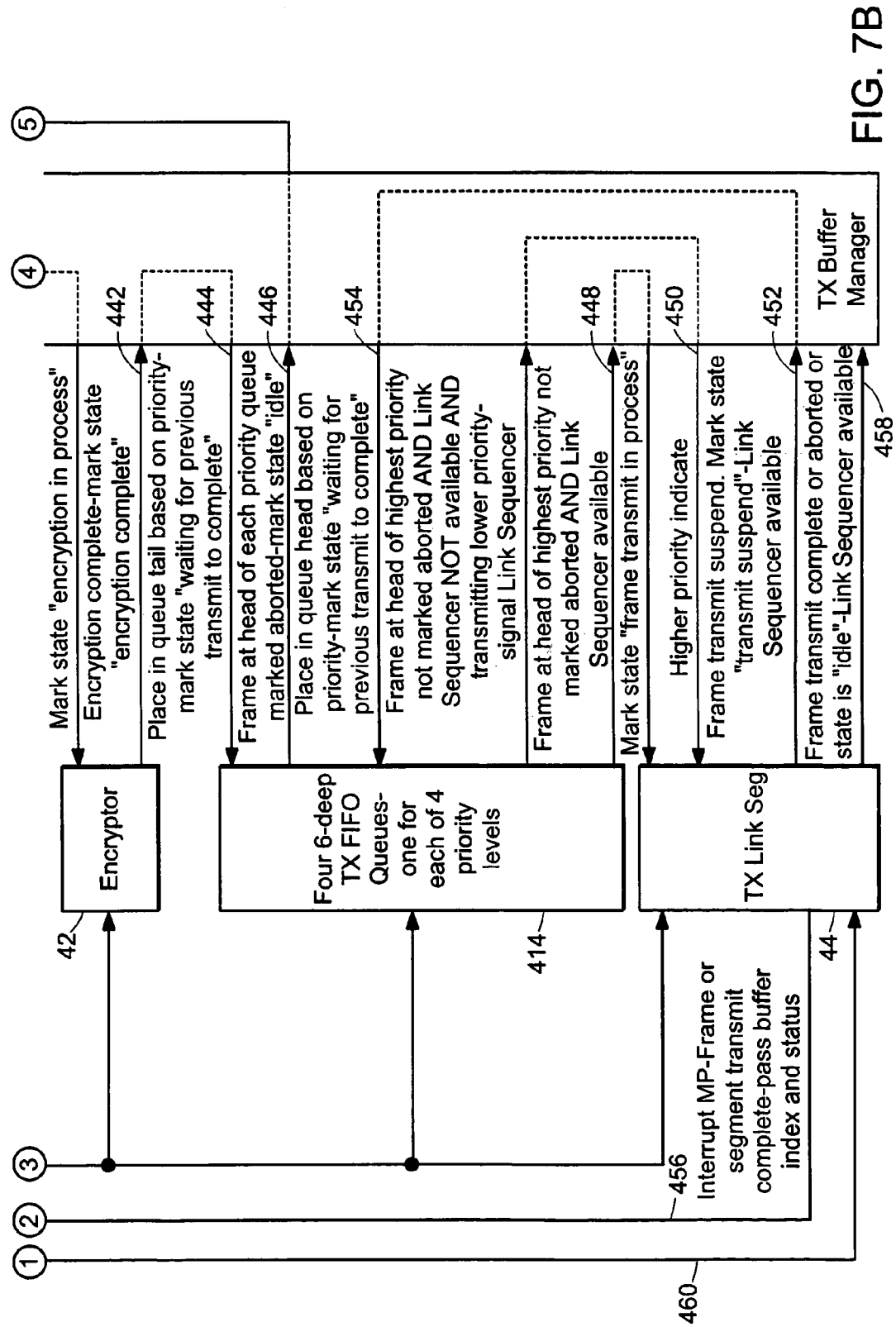
FIG. 7 is a block diagram illustrating the operation of a TX Buffer Manager for managing the TX buffers during a transmit operation.

Referring now to FIG. 7, the management of the TX buffers by the TX Buffer Manager 52 during transmit processing is shown. The general purpose buffers are initialized to an "idle" state by the MAC processing, with subsequent control under the TX Buffer Manager 52.

The TX Buffer Manager provides an empty (idle) buffer pool status to the TX Host Interface DMA 90 to reflect the number of empty buffers in the empty buffer group or pool 410 (task 422). This status may be used by the TX host interface to assert flow control. If a least one buffer is in the empty buffer pool 410, that one buffer's state is made "available to Host TxDMA" and the buffer is owned by the TX host Interface DMA 90 (task 424). If the buffer is owned by the TX host interface 82*b* and DMA engine 90, traffic is allowed to fill the buffer in the TX host interface buffer group. When frame reception is complete, the TX Buffer Manager 52 changes the buffer's status to "Host TxDMA complete" while the buffer awaits the availability of the MAC Processor 40 in a MAC queue 426 (task 428) Subsequently, the TX Buffer Manager 52 changes the buffer's state to "in use by MAC Processor" and generates an interrupt to the MAC Processor 40 (task 430). When the MAC Processor is interrupted by the TX Buffer Manager, it receives an index identifying the frame/buffer to be processed. After processing, the buffer's state is either marked "MAC discard", if no further transmission is to occur, or "MAC Processor complete," indicating that transmission is to proceed. If the frame is to be discarded or dropped, the TX Buffer Manager marks the buffer as "idle" and returns the idle buffer to the empty buffer pool (task 432).

In response to a "MAC Processor complete," the TX Buffer Manager places the buffer on the tail position of an encryptor FIFO queue 434 (task 436). Whenever the buffer at the head of the encryptor FIFO queue is marked for abort, its state is made "idle" and returned to the empty buffer pool (task 438). Whenever the buffer at the head of the encryptor FIFO queue is not marked for abort and the Encryptor is not in use, the TX Buffer Manager 52 changes the buffer's state to "encryption in process" and the buffer is owned by the Encryptor 42 (task 440). When a buffer's state is "encryption in process," the Encryptor 42 performs its encryption and makes the state of the frame "encryption complete" when finished (task 442).

The TX Buffer Manager 52 changes the buffer's state to "waiting for previous transmit to complete" and places the buffer in the tail position of one of the four TX FIFO queues of the TX buffer queue group 414 based in its priority (task 444). Whenever the buffer at the head of any of the priority based TX FIFO queues is marked for abort, its state is made "idle" and it is returned to the empty buffer pool (task 446). When the buffer at the head of any of the priority based TX FIFO queues is not marked for abort, and it is the highest priority compared to the other priority based TX FIFO queues, and the Link Sequencer is not in use, the buffer's state is changed to "frame transmit in process" and the buffer is owned by the Link Sequencer (task 448). When the buffer at the head of any of the priority based TX FIFO queues is not marked for abort, and it is the highest priority compared to the other priority based TX FIFO queues, and the Link Sequencer is in use, the TX Buffer Manager signals the Link Sequencer to indicate the priority of this buffer (task 450). If the priority of the buffer is higher than the one the Link Sequencer currently uses, the TX Buffer Manager receives from the Link Sequencer a "transmit suspend" state signal along with the suspended buffer and an indication that the Link Sequencer is available (task 452). The TX Buffer Manager marks that buffer's state as "Waiting for previous transmit to complete" and places the buffer in the head position of one of four TX FIFO queues based in its priority (task 454).

When the MAC Processor 40 is interrupted by the Link Sequencer 44, all frames in buffers with states after "MAC Processor complete," including the frame in the buffer owned by the Link Sequencer, are reviewed to determine whether their respective maximum transmit times have expired (task 456). These timers can be priority specific. All frames whose maximum transmit timers have expired are marked for abort. If the interrupting cause is that a frame or segment transmission has completed (successfully or unsuccessfully), the index passed in the interrupt vector is used to further process the frame. If the complete frame was transmitted successfully, its buffer's state is made "idle" (task 458). Otherwise, if the segment was transmitted successfully, the next segment's information is stored and the frame buffer is returned to the Link Sequencer with a "segment ready" asserted (task 460). If the segment was transmitted unsuccessfully, and another transmit is allowed, the segment's information is retained or changed (if a drop to ROBO mode is required) and the frame's buffer is returned to the Link Sequencer with "segment ready" asserted. If another transmit is not allowed, the frame's buffer state is made "idle" (task 458)

Whenever a frame's state is "frame transmit in process" and "segment ready" is asserted, if the frame is marked for abort, the Link Sequencer makes the frame's buffer state "idle" and indicates its availability. Else, if the frame is not marked for abort, the Link Sequence transmits the segment. Upon segment transmit completion, and if successful and the segment is the last segment, the Link Sequencer interrupts the MAC Processor to indicate successful frame transmission and to indicate availability (task 456). If the transmit is unsuccessful, the Link Sequencer de-asserts "segment ready" and interrupts the MAC Processor to indicate the transmission status. Whenever a signal is received from the TX Buffer Manager indicating that a higher priority frame is available for transmission, if the current buffer is not actively being transmitted, the Link Sequencer saves its state in the runtime structure 78 (FIG. 2) and mark its buffer state "transmit suspend". Whenever the Link Sequencer does not own a buffer, it indicates its availability to the TX Buffer Manager.

It will be appreciated that there may be as many higher priority interrupts as there are priority levels. Alternatively, the TX buffer scheme can be modified to support a one level buffer suspension and buffer aborts for other levels. In yet another alternative implementation, the Link Sequencer 44 can make a decision on whether to abort or continue processing a current transmit power line buffer based on the current delivery state of that buffer.

It will also be appreciated that the buffer contents do not necessarily have to move as a buffer moves through the different groups. A pointer can be moved and a state variable maintained to designate the group to which a buffer currently belongs.

It is to be understood that while the invention has been described in conjunction with the detailed description thereof, the foregoing description is intended to illustrate and not limit the scope of the invention, which is defined by the scope of the appended claims. Other embodiments are within the scope of the following claims.

What is claimed is:

1. A method of operating a Media Access Control (MAC) receiver, the method comprising:
   providing a receive buffer group, the receive buffer group being associated with a plurality of priority levels;
   allocating each of a plurality of receive buffers to a particular one of the plurality of priority levels in order of priority level from the highest priority level to the lowest priority level for reception of frame segments of a given priority level in a receive buffer allocated to the given priority level, including determining whether to re-allocate at least one previously allocated receive buffer in the group to a higher priority level than the priority level at which the previously allocated receive buffer was allocated; and
   maintaining an empty buffer group of empty buffers;
   wherein allocating includes moving empty buffers from the empty buffer group to the receive buffers group for use as receive buffers in the reception of frame segments, and re-allocating the receive buffers within the receive buffers group when no empty buffer is available in the empty buffer group, wherein re-allocating comprises performing a static re-allocation to re-allocate an unused buffer from a lower priority to a higher of the priority levels within the receive buffers group.

2. The method of claim 1, further comprising:
filling the receive buffers with the frame segments based on the priority levels; and
dispatching the filled receive buffers for delivery to a host interface in order of highest to lowest of the priority levels.

3. The method of claim 2 further including:
allocating an empty receive buffers to the priority levels of the dispatched receive buffers.

4. The method of claim 1, wherein re-allocating further comprises performing a dynamic re-allocation that attempts to re-allocate first an unused, and then a used, buffer from a lower to a higher of the priority levels within the receive buffers group at such time as it is determined that a frame segment is to be received.

5. The method of claim 1, wherein determining whether to re-allocate at least one previously allocated receive buffer in the group to a higher priority than a priority at which the previously allocated receive buffer was allocated comprises determining whether to re-allocate the previously allocated receive buffer from the lowest priority at which at least one unused buffer is available to the highest priority at which no receive buffer is available.

6. The method of claim 1, wherein determining whether to re-allocate at least one previously allocated receive buffer in the group to a higher priority than a priority at which the previously allocated receive buffer was allocated comprises determining whether to re-allocate the previously allocated receive buffer from the lowest priority at which at least one used buffer is available to the highest priority at which no receive buffer is available, wherein the used buffer is partially filled with received data.

7. The method of claim 1, wherein re-allocating further comprises re-allocating an unused buffer from a lower to a higher priority in response to determining that no buffer previously allocated to the higher priority is available.

8. The method of claim 1, wherein re-allocating further comprises re-allocating a used buffer from a lower to a higher priority in response to determining that data of the higher priority is to be received.

9. The method of claim 1 wherein determining whether to re-allocate at least one previously allocated receive buffer includes determining that the at least one previous allocated receive buffer is valid and empty.

10. A method of operating a Media Access Control (MAC) transmitter comprising:
filling empty transmit buffers with data to provide completed transmit buffers;
queuing completed transmit buffers;
delivering a completed transmit buffer from the queued completed transmit buffers to a PHY interface to prepare to transmit the completed transmit buffer while monitoring the queued completed transmit buffers for higher priority transmit buffers than the completed transmit buffer delivered to the PHY interface, and in response to determining that the queued completed transmit buffers include a higher priority transmit buffer, saving a state associated with the completed transmit buffer, and returning the completed transmit buffer to the queued completed transmit buffers;
transmitting the contents of the higher priority transmit buffer, emptying the buffer;
allocating the higher priority buffer to an encryptor queue one the higher priority buffer is emptied.

11. The method of claim 10, wherein delivering comprises:
determining that the queued completed transmit buffers include a first transmit buffer that is of a higher priority than a second transmit buffer that is being prepared for transmit;
generating a priority-based interruption to cause the transmit preparation of the second transmit buffer to be suspended;
preparing the first transmit buffer for transmit; and
preparing the second transmit buffer for transmit after the first transmit buffer has been transmitted.

12. The method of claim 10, further comprising, in response to determining that the queued completed transmit buffers include a higher priority transmit buffer, determining that the completed transmit buffer is not actively being transmitted.

13. A method of operating a MAC transceiver comprising:
dispatching completed receive buffers queued in a multi-level priority queue for delivery to a host interface in priority order, including allocating each of the receive buffers to a particular priority level in the multi-level priority queue in order of priority level from the highest priority level to the lowest priority level and determining whether to re-allocate at least one previously allocated receive buffer in the queue to a higher priority than a priority at which the previously allocated receive buffer was allocated; and
delivering a completed transmit buffer queued in a multi-level priority queue to a PHY interface to prepare to transmit the completed transmit buffer while monitoring queued completed transmit buffers for higher priority transmit buffers, and in response to determining that the queued completed transmit buffers include a higher priority transmit buffer, saving a state associated with the completed transmit buffer, and returning the completed transmit buffer to the queued completed transmit buffers.

14. The method of claim 13, wherein the priority levels comprise four levels of priority.

15. A computer program residing on a non-transitory computer-readable medium for operating a transceiver in a network node, the computer program comprising instructions causing a computer to:
dispatch completed receive buffers queued in a multi-level priority queue for delivery to a host interface in priority order, including allocating each of the receive buffers to a particular priority level in the multi-level priority queue in order of priority level from the highest priority level to the lowest priority level and determining whether to re-allocate at least one previously allocated receive buffer in the queue to a higher priority than a priority at which the previously allocated receive buffer was allocated; and
deliver a completed transmit buffer queued in a multi-level priority queue to a PHY interface to prepare to transmit the completed transmit buffer while monitoring queued completed transmit buffers for higher priority transmit buffers, and in response to determining that the queued completed transmit buffers include a higher priority transmit buffer, saving a state associated with the completed transmit buffer, and returning the completed transmit buffer to the queued completed transmit buffers.

16. A Media Access Control (MAC) transmitter comprising:
- transmit buffers;
- encryptor;
- means for filling empty transmit buffers with data to provide completed transmit buffers;
- means for queuing completed ones of the transmit buffers;
- means for queuing empty buffers;
- means for delivering a completed transmit buffer to a PHY interface to prepare to transmit the completed transmit buffer while monitoring the queued completed transmit buffers for higher priority transmit buffers, and in response to determining that the queued completed transmit buffers include a higher priority transmit buffer, saving a state associated with the completed transmit buffer, and returning the completed transmit buffer to the queued completed transmit buffers;
- means for transmitting the contents of the higher priority buffer, emptying the higher priority buffer; and
- means for allocating the empty buffer to the empty buffer queue.

17. A Media Access Control (MAC) transceiver comprising:
- means for dispatching completed receive buffers queued in a multi-level priority queue for delivery to a host interface in priority order, including allocating receive buffers to a particular priority level in the multi-level priority queue in order of priority level from the highest priority level to the lowest priority level and determining whether to re-allocate at least one previously allocated receive buffer in the queue to a higher priority than a priority at which the previously allocated receive buffer was allocated; and
- means for delivering a completed transmit buffer queued in a multi-level priority queue to a PHY interface to prepare to transmit the completed transmit buffer while monitoring queued completed transmit buffers for higher priority transmit buffers, and in response to determining that the queued completed transmit buffers include a higher priority transmit buffer, saving a state associated with the completed transmit buffer, and returning the completed transmit buffer to the queued completed transmit buffers.

\* \* \* \* \*